(12) United States Patent
Han et al.

(10) Patent No.: US 8,483,165 B2
(45) Date of Patent: Jul. 9, 2013

(54) METHOD AND APPARATUS FOR TRANSMITTING A REFERENCE SIGNAL IN A WIRELESS COMMUNICATION SYSTEM

(75) Inventors: Seung Hee Han, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 13/255,236

(22) PCT Filed: Mar. 22, 2010

(86) PCT No.: PCT/KR2010/001744
§ 371 (c)(1),
(2), (4) Date: Sep. 7, 2011

(87) PCT Pub. No.: WO2010/110562
PCT Pub. Date: Sep. 30, 2010

(65) Prior Publication Data
US 2012/0002740 A1    Jan. 5, 2012

Related U.S. Application Data

(60) Provisional application No. 61/167,870, filed on Apr. 9, 2009, provisional application No. 61/162,322, filed on Mar. 22, 2009.

(30) Foreign Application Priority Data

Mar. 19, 2010 (KR) .......................... 10-2010-0024720

(51) Int. Cl.
*H04W 4/00* (2009.01)

(52) U.S. Cl.
USPC .......................................................... 370/329

(58) Field of Classification Search
USPC .............. 370/310, 310.2, 315, 328, 338, 329, 370/330, 343, 431, 464, 436, 465, 252; 455/452.1, 450, 432.1
See application file for complete search history.

(56) References Cited

U.S. PATENT DOCUMENTS 7,792,013 B2 * 9/2010 Green et al. ................... 370/208
7,940,740 B2 * 5/2011 Krishnamurthy et al. .... 370/344

FOREIGN PATENT DOCUMENTS

| KR | 1020060061359 | 6/2006 |
| KR | 1020080045750 | 5/2008 |
| KR | 1020080098650 | 11/2008 |

\* cited by examiner

*Primary Examiner* — Anh Ngoc Nguyen
(74) *Attorney, Agent, or Firm* — Lee, Hong, Degerman, Kang & Waimey

(57) ABSTRACT

A method and an apparatus for transmitting a reference signal in a wireless communication system are provided. A first base station maps a first reference signal to a resource region and transmits the first reference signal to a user equipment. A second base station maps a second reference signal to said resource region and transmits the second reference signal to said user equipment. The resource elements, to which the first reference signal and the second reference signal are mapped in the resource region, are determined in accordance with the index on a Latin square matrix occupied by two different elements, respectively, from among N elements constituting the Latin square matrix with a size of N×N.

6 Claims, 44 Drawing Sheets

FIG. 7
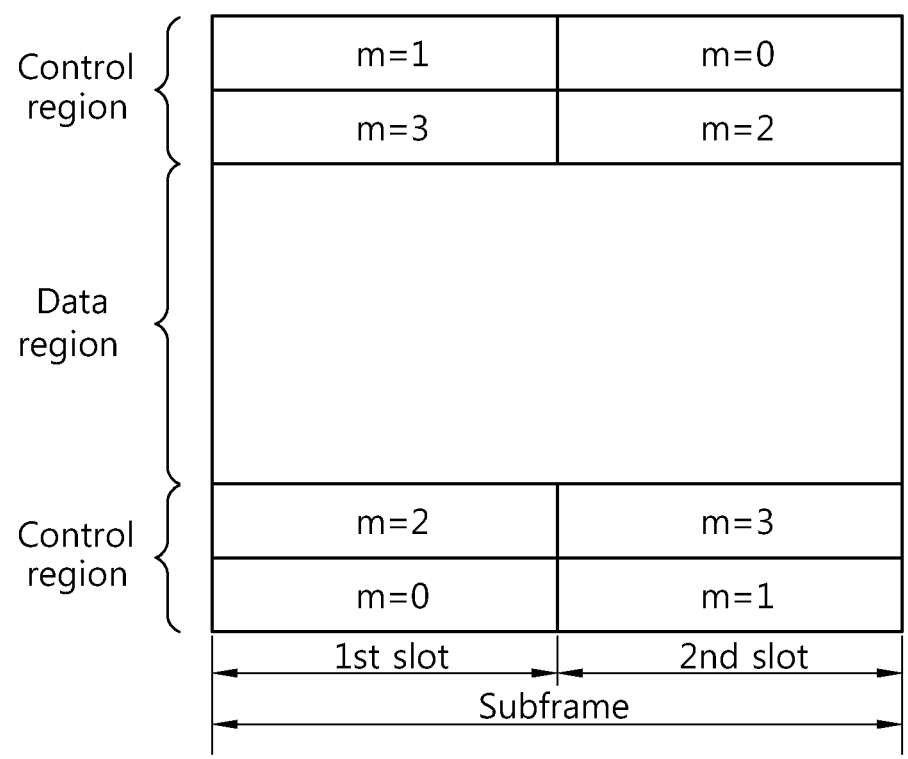
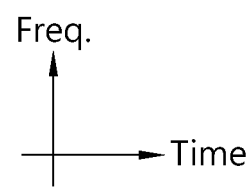

Antenna 0

FIG. 26
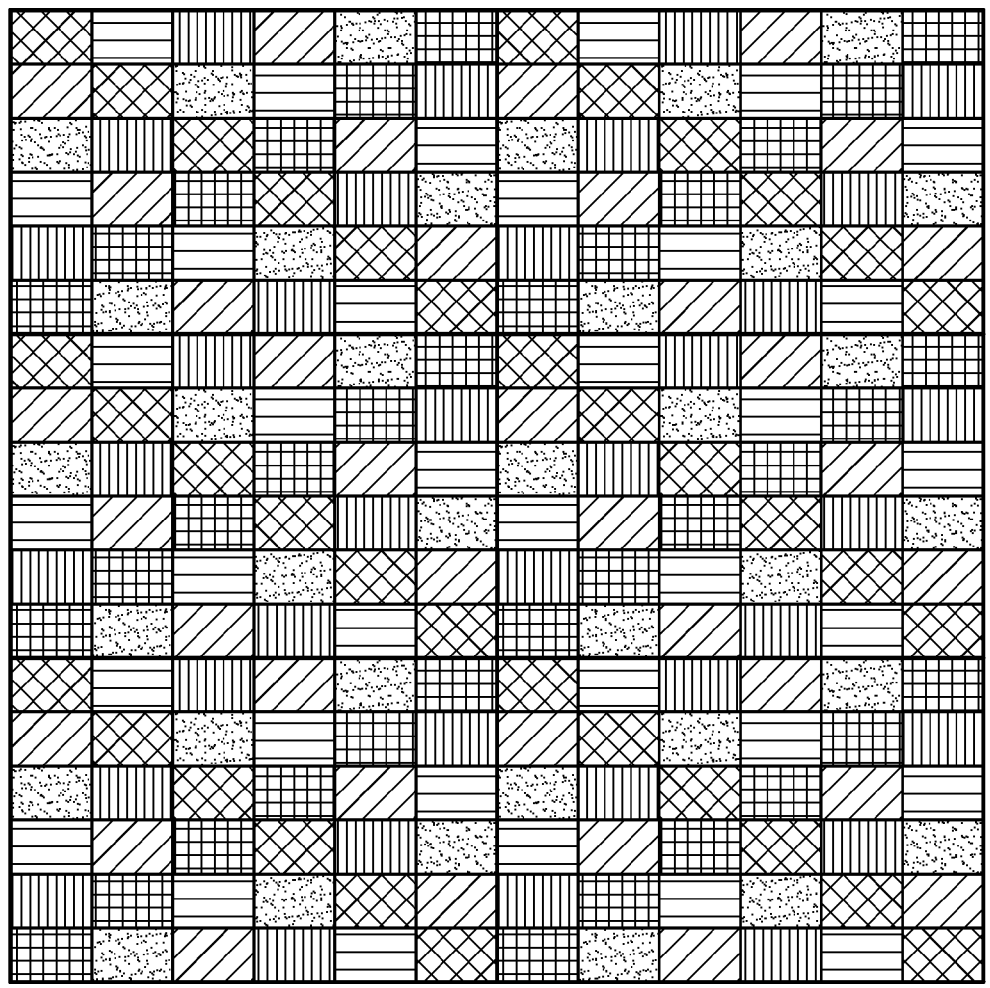
 Cell #0   Cell #3
 Cell #1   Cell #4
 Cell #2   Cell #5

FIG. 27
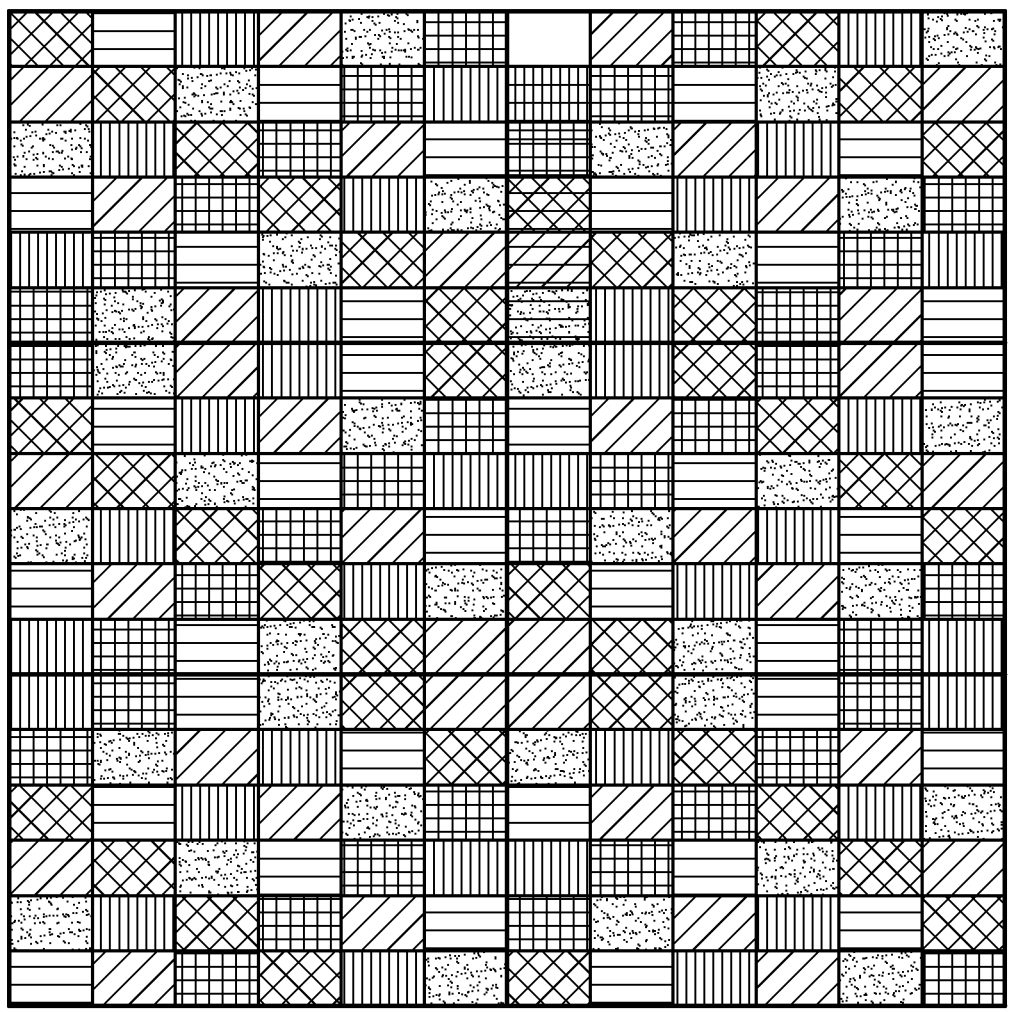
 Cell #0    Cell #3
 Cell #1    Cell #4
 Cell #2    Cell #5

| ⧄ | Cell #0 |
| ⧅ | Cell #1 |
| ⊠ | Cell #2 |
| ▦ | Cell #2 |

FIG. 29

| | | 0 | 6 | 8 | 9 | 7 | 10 | 1 | 4 | 2 | 3 | 5 | 11 |
|---|---|---|---|---|---|---|---|---|---|---|---|---|---|
| | | 1 | 0 | 4 | 6 | 2 | 8 | 3 | 9 | 5 | 7 | 11 | 10 |
| | | 2 | 7 | 0 | 3 | 10 | 6 | 5 | 1 | 8 | 11 | 4 | 9 |
| | | 3 | 1 | 9 | 0 | 5 | 4 | 7 | 6 | 11 | 2 | 10 | 8 |
| | | 4 | 8 | 5 | 10 | 0 | 2 | 9 | 11 | 1 | 6 | 3 | 7 |
| | | 5 | 2 | 1 | 7 | 8 | 0 | 11 | 3 | 4 | 10 | 9 | 6 |
| | | 6 | 9 | 10 | 4 | 3 | 11 | 0 | 8 | 7 | 1 | 2 | 5 |
| | | 7 | 3 | 6 | 1 | 11 | 9 | 2 | 0 | 10 | 5 | 8 | 4 |
| | | 8 | 10 | 2 | 11 | 6 | 7 | 4 | 5 | 0 | 9 | 1 | 3 |
| | | 9 | 4 | 11 | 8 | 1 | 5 | 6 | 10 | 3 | 0 | 7 | 2 |
| | | 10 | 11 | 7 | 5 | 9 | 3 | 8 | 2 | 6 | 4 | 0 | 1 |
| | | 11 | 5 | 3 | 2 | 4 | 1 | 10 | 7 | 9 | 8 | 6 | 0 |

1 Subframe

CRS

PCFICH/PHICH/PDCCH

Proposed RS

FIG. 30
| | | 0 | 3 | 4 | 1 | 2 | 5 | 0 | 3 | 4 | 1 | 2 | 5 |
|---|---|---|---|---|---|---|---|---|---|---|---|---|---|
| | | 1 | 0 | 2 | 3 | 5 | 4 | 1 | 0 | 2 | 3 | 5 | 4 |
| | | 2 | 4 | 0 | 5 | 1 | 3 | 2 | 4 | 0 | 5 | 1 | 3 |
| | | 3 | 1 | 5 | 0 | 4 | 2 | 3 | 1 | 5 | 0 | 4 | 2 |
| | | 4 | 5 | 3 | 2 | 0 | 1 | 4 | 5 | 3 | 2 | 0 | 1 |
| | | 5 | 2 | 1 | 4 | 3 | 0 | 5 | 2 | 1 | 4 | 3 | 0 |
| | | 0 | 3 | 4 | 1 | 2 | 5 | 0 | 3 | 4 | 1 | 2 | 5 |
| | | 1 | 0 | 2 | 3 | 5 | 4 | 1 | 0 | 2 | 3 | 5 | 4 |
| | | 2 | 4 | 0 | 5 | 1 | 3 | 2 | 4 | 0 | 5 | 1 | 3 |
| | | 3 | 1 | 5 | 0 | 4 | 2 | 3 | 1 | 5 | 0 | 4 | 2 |
| | | 4 | 5 | 3 | 2 | 0 | 1 | 4 | 5 | 3 | 2 | 0 | 1 |
| | | 5 | 2 | 1 | 4 | 3 | 0 | 5 | 2 | 1 | 4 | 3 | 0 |
1 Subframe
 CRS
 PCFICH/PHICH/PDCCH
 Proposed RS

FIG. 31

FIG. 32
| | | 0 | 6 | 8 | 9 | 7 | 10 | 1 | 4 | 2 | 3 |
|---|---|---|---|---|---|---|---|---|---|---|---|
| | | 1 | 0 | 4 | 6 | 2 | 8 | 3 | 9 | 5 | 7 |
| | | 2 | 7 | 0 | 3 | 10 | 6 | 5 | 1 | 8 | 11 |
| | | 3 | 1 | 9 | 0 | 5 | 4 | 7 | 6 | 11 | 2 |
| | | 4 | 8 | 5 | 10 | 0 | 2 | 9 | 11 | 1 | 6 |
| | | 5 | 2 | 1 | 7 | 8 | 0 | 11 | 3 | 4 | 10 |
| | | 6 | 9 | 10 | 4 | 3 | 11 | 0 | 8 | 7 | 1 |
| | | 7 | 3 | 6 | 1 | 11 | 9 | 2 | 0 | 10 | 5 |
| | | 8 | 10 | 2 | 11 | 6 | 7 | 4 | 5 | 0 | 9 |
| | | 9 | 4 | 11 | 8 | 1 | 5 | 6 | 10 | 3 | 0 |
| | | 10 | 11 | 7 | 5 | 9 | 3 | 8 | 2 | 6 | 4 |
| | | 11 | 5 | 3 | 2 | 4 | 1 | 10 | 7 | 8 | 8 |
1 Subframe
 CRS
 PCFICH/PHICH/PDCCH
 Proposed RS FIG. 33
| | | 8 | 9 | 7 | 10 | 1 | 4 | 2 | 3 | 5 | 11 |
|---|---|---|---|---|---|---|---|---|---|---|---|
| | | 4 | 6 | 2 | 8 | 3 | 9 | 5 | 7 | 11 | 10 |
| | | 0 | 3 | 10 | 6 | 5 | 1 | 8 | 11 | 4 | 9 |
| | | 9 | 0 | 5 | 4 | 7 | 6 | 11 | 2 | 10 | 8 |
| | | 5 | 10 | 0 | 2 | 9 | 11 | 1 | 6 | 3 | 7 |
| | | 1 | 7 | 8 | 0 | 11 | 3 | 4 | 10 | 9 | 6 |
| | | 10 | 4 | 3 | 11 | 0 | 8 | 7 | 1 | 2 | 5 |
| | | 6 | 1 | 11 | 9 | 2 | 0 | 10 | 5 | 8 | 4 |
| | | 2 | 11 | 6 | 7 | 4 | 5 | 0 | 9 | 1 | 3 |
| | | 11 | 8 | 1 | 5 | 6 | 10 | 3 | 0 | 7 | 2 |
| | | 7 | 5 | 9 | 3 | 8 | 2 | 6 | 4 | 0 | 1 |
| | | 3 | 2 | 4 | 1 | 10 | 7 | 8 | 8 | 6 | 0 |
1 Subframe
 CRS
 PCFICH/PHICH/PDCCH
 Proposed RS FIG. 34
| | | 0 | 3 | 4 | 1 | 2 | 5 | 0 | 3 | 4 | 1 |
| | | 1 | 0 | 2 | 3 | 5 | 4 | 1 | 0 | 2 | 3 |
| | | 2 | 4 | 0 | 5 | 1 | 3 | 2 | 4 | 0 | 5 |
| | | 3 | 1 | 5 | 0 | 4 | 2 | 3 | 1 | 5 | 0 |
| | | 4 | 5 | 3 | 2 | 0 | 1 | 0 | 3 | 4 | 1 |
| | | 5 | 2 | 1 | 4 | 3 | 0 | 1 | 0 | 2 | 3 |
| | | 0 | 3 | 4 | 1 | 2 | 5 | 2 | 4 | 0 | 5 |
| | | 1 | 0 | 2 | 3 | 5 | 4 | 3 | 1 | 5 | 0 |
| | | 2 | 4 | 0 | 5 | 1 | 3 | 0 | 3 | 4 | 1 |
| | | 3 | 1 | 5 | 0 | 4 | 2 | 1 | 0 | 2 | 3 |
| | | 4 | 5 | 3 | 2 | 0 | 1 | 2 | 4 | 0 | 5 |
| | | 5 | 2 | 1 | 4 | 3 | 0 | 3 | 1 | 5 | 0 |
1 Subframe
 CRS
 PCFICH/PHICH/PDCCH
 Proposed RS

METHOD AND APPARATUS FOR TRANSMITTING A REFERENCE SIGNAL IN A WIRELESS COMMUNICATION SYSTEM

CROSS-REFERENCE TO RELATED APPLICATIONS

This application is the National Stage filing under 35 U.S.C. of International Application No. PCT/KR2010/001744, filed on Mar. 22, 2010, which claims the benefit of earlier filing date and right of priority to Korean Application No. 10-2010-0024720, filed on Mar. 19, 2010, and also claims the benefit of U.S. Provisional Application Ser. Nos. 61/167,870, filed on Apr. 9, 2009, and 61/162,322, filed on Mar. 22, 2009, the contents of which are all hereby incorporated by reference herein in their entirety.

BACKGROUND OF THE INVENTION

1. Field of the Invention

The present invention relates to wireless communications, and more particularly, to a method and apparatus for transmitting a reference signal in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, Inter-Symbol Interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on. An OFDM system is being considered after the $3^{rd}$ generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system. MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h} = y/p = h + n/p = h + \hat{n} \qquad \text{[Equation 1]}$$

The accuracy of the channel estimation value ĥ estimated using the reference signal p is determined by the value n̂. To accurately estimate the value h, the value n̂ must converge on 0. To this end, the influence of the value n̂ has to be minimized by estimating a channel using a large number of reference signals. A variety of algorithms for a better channel estimation performance may exist.

Meanwhile, UE positioning for estimating a location of a UE has recently been used for various usages in real life, and thus a more precise UE positioning method is required. The UE positioning is classified into two schemes.

1) Global Positioning System (GPS)-based scheme: It is a scheme of estimating a location of a UE by using a satellite. Information needs to be received from at least 4 satellites, and disadvantageously this scheme cannot be used in an indoor environment.

2) Terrestrial positioning-based scheme: It is a scheme for estimating a location of a UE by using a timing difference of signals transmitted from BSs. A signal needs to be received from at least three BSs. Even if estimation performance is not good in comparison with the GPS-based scheme, it can be used in almost all environments. A reference signal is mainly used as a signal received from the BS. According to a wireless communication system in use, the timing difference can be defined variously, such as, an Observed Time Difference Of Arrival (OTDOA) in a UMTS Terrestrial Radio Access Network (UTRAN), an Enhanced Observed Time Difference (E-OTD) in a GSM/EDGE Radio Access Network (GERAN), and an Advanced Forward Link Trilateration (AFLT) in CDMA2000.

In the UE positioning scheme, a Location Service (LCS) Reference Signal (RS) can be used. The LCS RS may include a synchronization signal. The UE can receive the LCS RS transmitted from each cell and use a delay difference of each signal. The UE can report the delay difference to the BS so as to allow the BS to calculate the location of the UE, or can calculate the location of the UE by itself. In order to decrease inter-cell interference and to acquire a signal having a high SINR, LCS RSs transmitted from respective cells must not overlap from each other when the UE receives the LCS RS.

FIG. 1 shows a multi-cell mobile communication system and an interference relation between cells. Several BSs cover a full area of the mobile communication system, and each BS provides a service to UEs within a specific area. Each BS can provide the same service to the UEs, or can provide different services to the UEs. Each BS can provide a service by using the same resource region. In this case, a UE which receives a service from a serving cell may be interfered from a neighbor cell. Referring to FIG. 1, a UE regards a BS 1 as a serving cell. Neighbor cells (i.e., BS 2, BS 3, BS 4, BS 5, BS 6, BS 7) other than the serving cell act as interference to the UE. Among them, the nearest neighbor cell, i.e., the BS 2, acts as the strongest interference to the UE. The interference can have a significant effect particularly on a UE which is located in a cell edge. When the UE is interfered from the neighbor cell, the UE cannot feedback correct channel state information to the BS, and system efficiency deteriorates. In order to accurately measure an interference level of the neighbor cell, null resource elements (REs) may be mapped to a resource region in which a reference signal of the neighbor cell is located.

FIG. 2 shows a multi-sector mobile communication system and an interference relation between sectors. As described in FIG. 1 above, the influence of interference can also be applied to a case where one cell is divided into a plurality of sectors.

A reference signal structure for effective channel estimation and channel state measurement is required.

SUMMARY OF THE INVENTION

The present invention provides a method and apparatus for transmitting a reference signal in a wireless communication system.

In an aspect, a method for transmitting a reference signal in a wireless communication system is provided. The method includes transmitting by a first base station a first reference signal to a user equipment by mapping the first reference to a resource region, transmitting by a second base station a second reference signal to the user equipment by mapping the second reference signal to the resource region, wherein resource elements to which the first reference signal and the second reference signal are mapped in the resource region are determined in accordance with an index on a Latin square matrix occupied by two different elements, respectively, from among N elements constituting the Latin square matrix with a size of N×N. A frequency index k of the resource element to which the first reference signal or the second reference signal is mapped may be determined by at least one of an index of a cell identifier (ID) or a cell ID index obtained by considering a reuse factor, an orthogonal frequency division multiplexing (OFDM) symbol index of a resource element for transmitting the first reference signal or the second reference signal, a function of the index of the cell ID or a function of the reuse factor, the number of OFDM symbols included in one subframe, and an index of a subblock constituting the resource region. An OFDM symbol of the resource element to which the first reference signal or the second reference signal is mapped may be an OFDM symbol to which a cell-specific reference signal (CRS) or a physical downlink control channel (PDCCH) is not mapped. At least one of columns or rows of the Latin square matrix may be permutated or circularly shifted. The permutation or cyclic shift may be performed on the remaining columns or rows while fixing one column or row of the Latin square matrix. The resource region may include a plurality of subblocks having a size of N×N, and resource elements to which the first reference signal and the second reference signal are mapped in each subblock may be determined according to the Latin square matrix corresponding to each subblock. The Latin square matrix corresponding to each subblock may vary along a frequency domain or a time domain.

In another aspect, a receiver in a wireless communication system is provided. The receiver includes a receive circuitry for receiving a radio signal including a reference signal, a channel estimator for estimating a channel by using the reference signal, and a processor for processing the radio signal by using the estimated channel, wherein the channel estimator is configured for receiving a plurality of reference signals mapped on a resource region respectively from a plurality of base stations, and is configured for estimating a location of a user equipment by using the received reference signals, and wherein a resource element for transmitting the plurality of reference signals on the resource region is determined according to an index on the Latin square matrix occupied respectively by different elements among N elements constituting the N×N-sized Latin square matrix. A frequency index k of the resource element to which the first reference signal or the second reference signal is mapped may be determined by at least one of an index of a cell identifier (ID) or a cell ID index obtained by considering a reuse factor, an orthogonal frequency division multiplexing (OFDM) symbol index of a resource element for transmitting the first reference signal or the second reference signal, the number of OFDM symbols included in one subframe, an index of a subblock constituting the resource region, and a function of the index of the cell ID or a function of the reuse factor.

Since transmission is performed by preventing reference signals transmitted from respective cells against collision or by minimizing collision, performance of channel estimation or User Equipment (UE) positioning can be improved.

BRIEF DESCRIPTION OF THE DRAWINGS

FIG. 7 shows the structure of an uplink subframe.

FIG. 26 and FIG. 27 show another exemplary reference signal structure for multi-antenna transmission.

FIG. 29 shows an exemplary reference signal structure allocated to one subframe.

FIG. 30 to FIG. 43 show another exemplary reference signal structure allocated to one subframe.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ Generation, Partnership Project) LTE (Long Term Evolution) is part of an evolved UMTS (E-UMTS) using the E-UTRA, which employs the OFDMA in downlink and the SC-FDMA in uplink. LTE-A (Advanced) is an evolution of 3GPP LTE.

Hereinafter, for clarification, LET-A will be largely described, but the technical concept of the present invention is not meant to be limited thereto.

Figure 1:
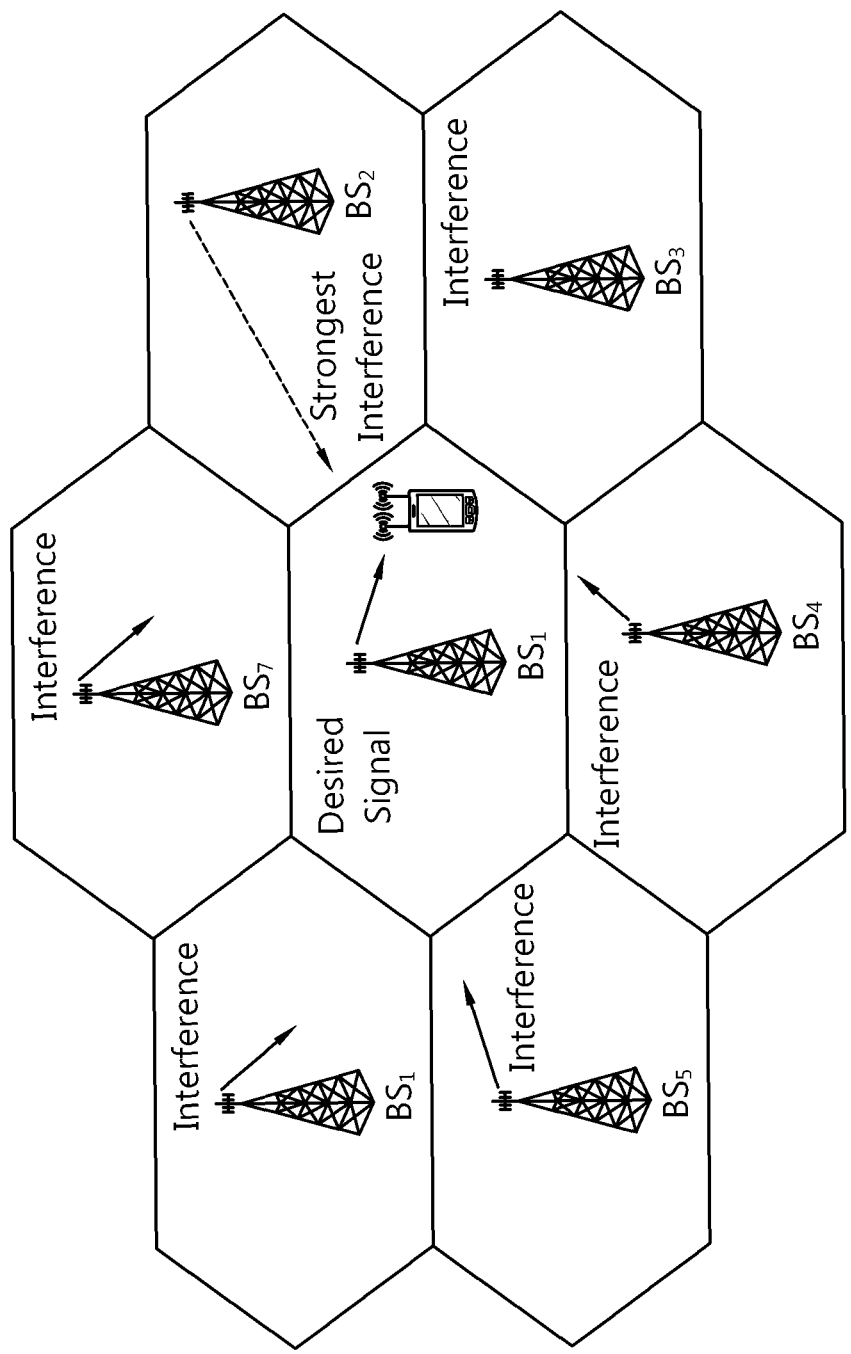
FIG. 1 shows a multi-cell mobile communication system and an interference relation between cells.
Figure 2:
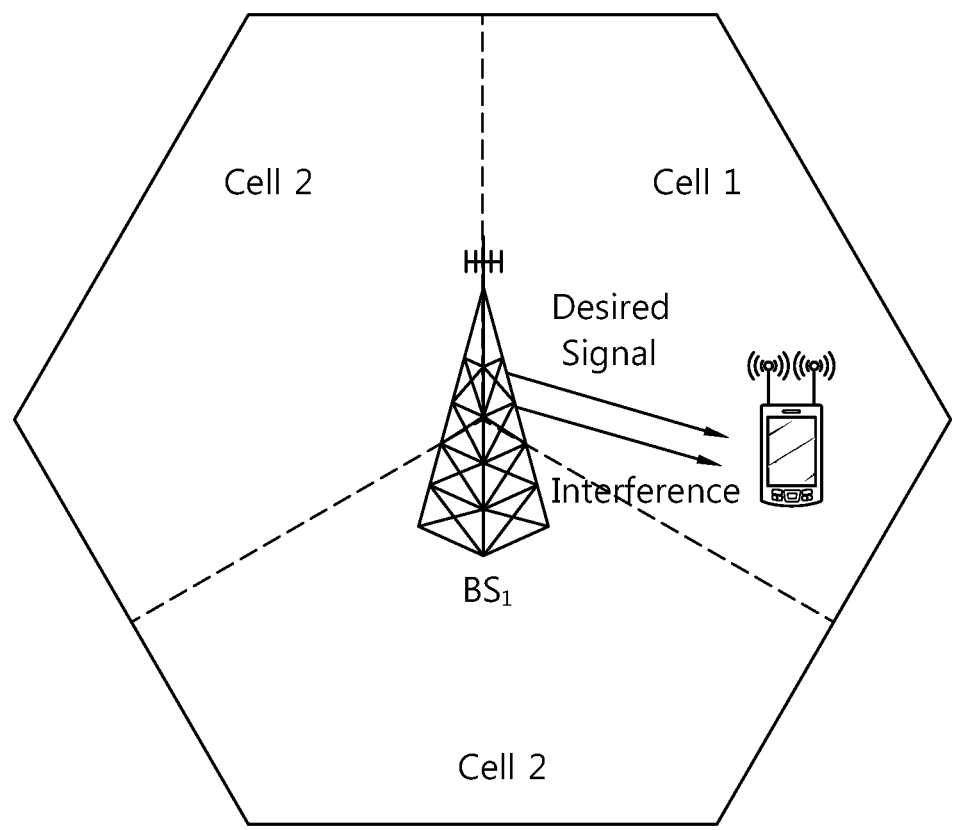
FIG. 2 shows a multi-sector mobile communication system and an interference relation between sectors.
Figure 3:
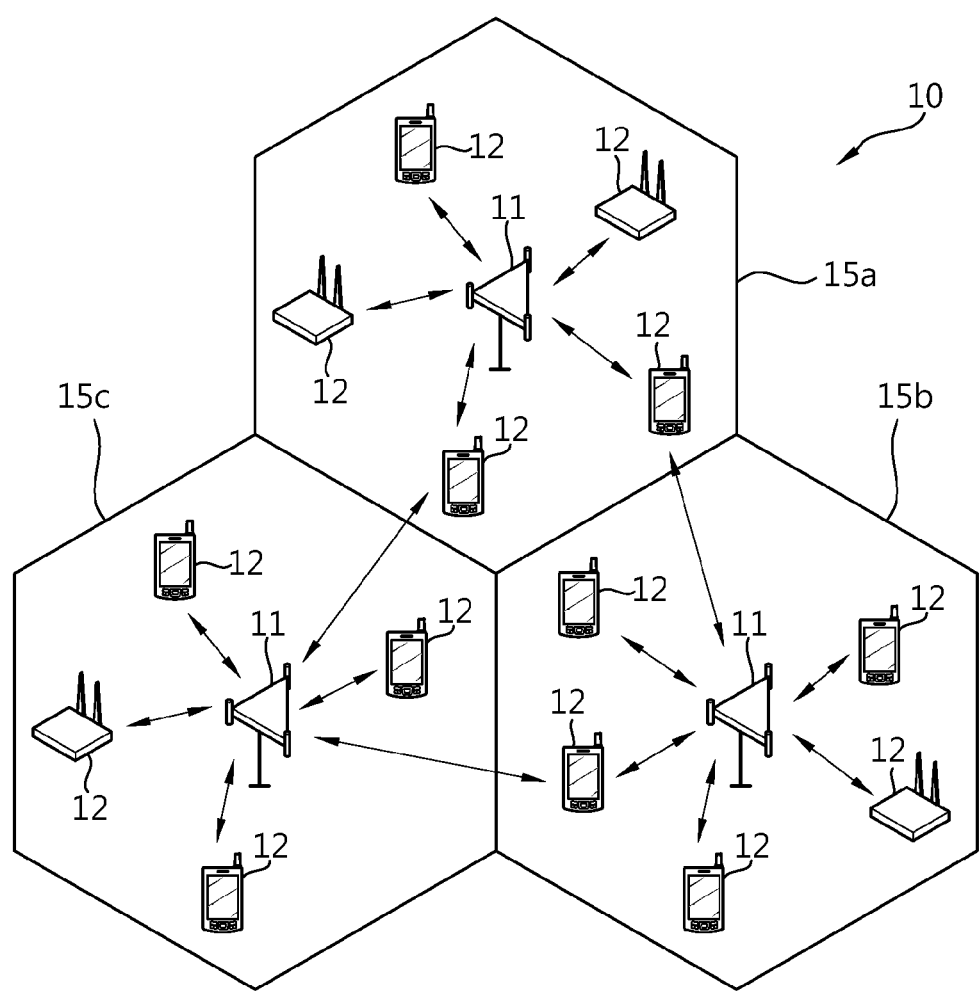
FIG. 3 shows a wireless communication system.

FIG. 3 shows a wireless communication system.

Referring to FIG. 3, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 4:
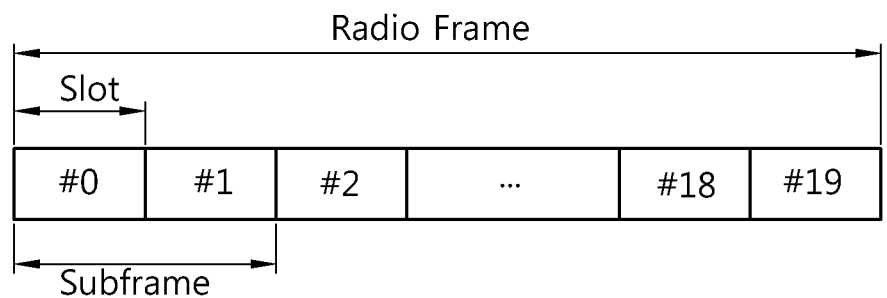
FIG. 4 shows the structure of a radio frame in the 3GPP LTE specifications.

FIG. 4 shows the structure of a radio frame in the 3GPP LTE specifications. For the radio frame structure, reference can be made to Paragraph 5 of 3GPP ($3^{rd}$ Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 4, the radio frame includes ten sub-frames, and one sub-frame includes two slots. The slots within the radio frame are allocated slot numbers from #0 to #19. The time that it takes to transmit one sub-frame is called a Transmission Time Interval (TTI). The TTI can be called a scheduling unit for data transmission. For example, the length of one radio frame can be 10 ms, the length of one sub-frame can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of sub-frames included in a radio frame, the number of slots included in a sub-frame, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

Figure 5:
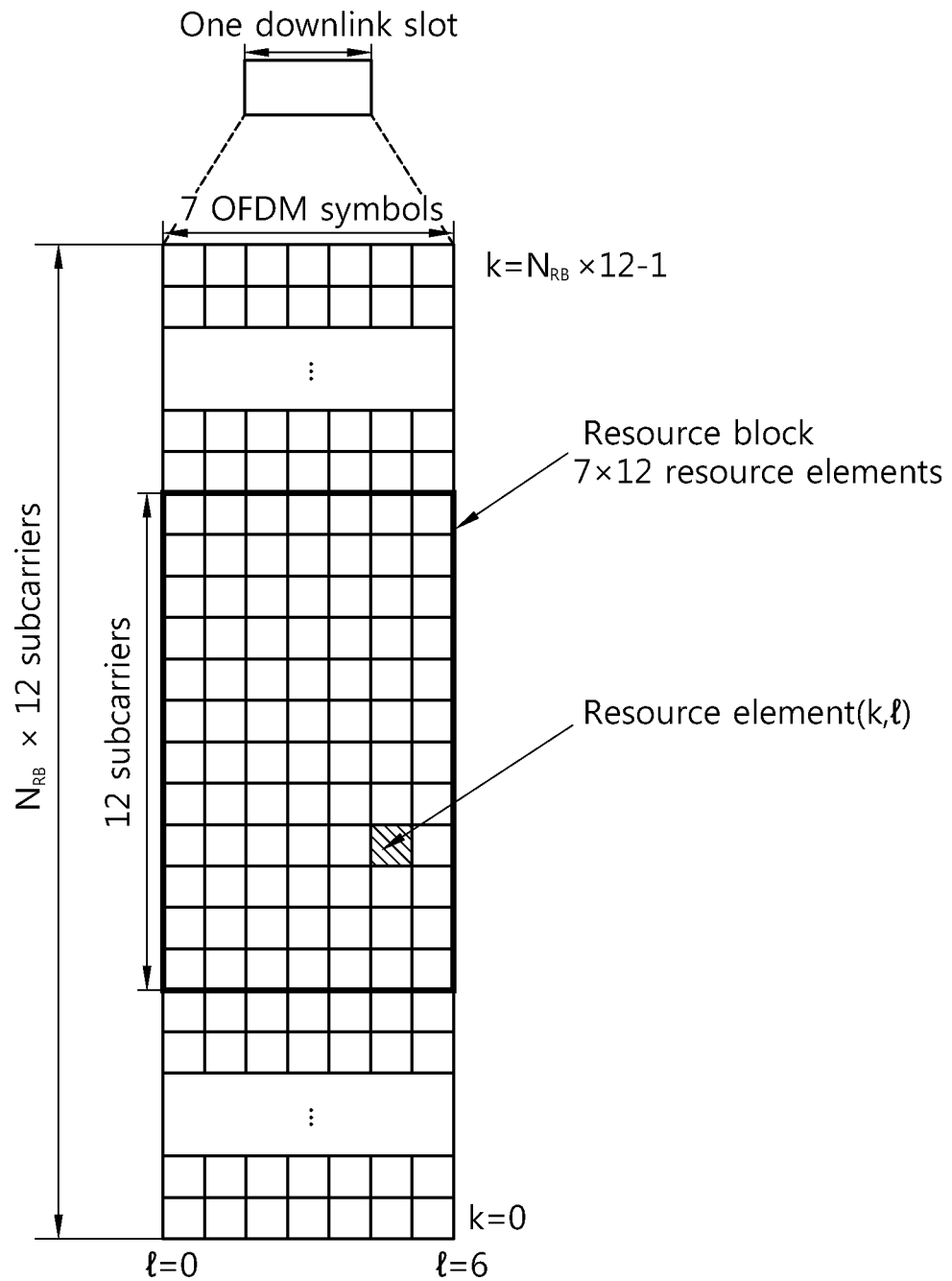
FIG. 5 shows an example of a resource grid for one downlink slot.

FIG. 5 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k, l) within a slot. Here, $k(k=0, \ldots, N_{RB} \times 12-1)$ denotes a subcarrier index in the frequency domain, and $l(l=0, \ldots, 6)$ denotes an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited to the 7×12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6. In one OFDM symbol, the number of subcarriers can be one of 128, 256, 512, 1024, 1536, and 2048.

Figure 6:
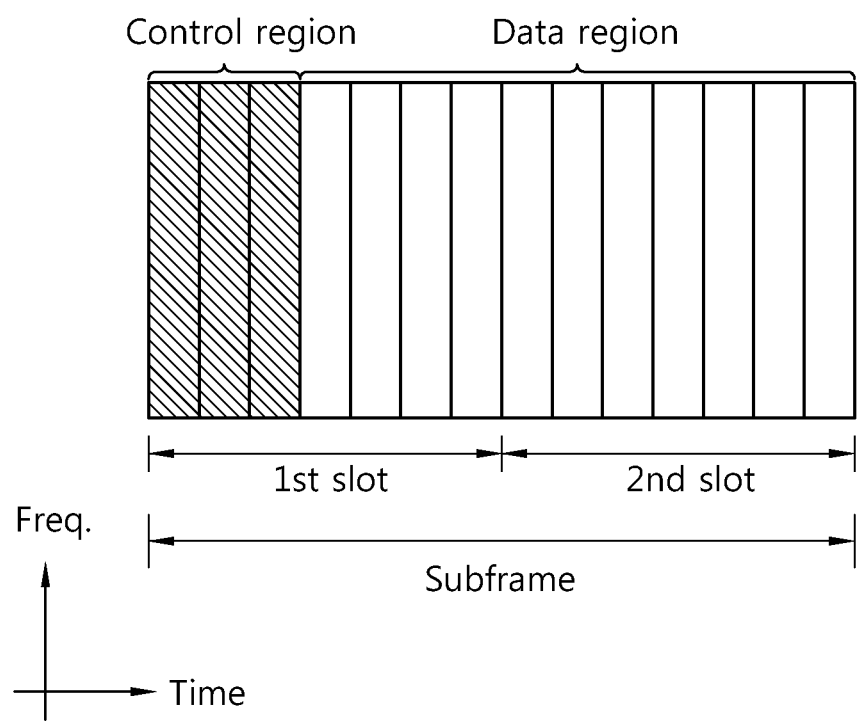
FIG. 6 shows the structure of a downlink subframe.

FIG. 6 shows the structure of a downlink sub-frame.

The downlink sub-frame includes two slots in the time domain. Each of the slots includes 7 OFDM symbols in the normal CP. A maximum of three OFDM symbols (maximum four OFDM symbols with respect to a 1.4 MHz bandwidth) of the first slot within the sub-frame correspond to a control region to which control channels are allocated, and the remaining OFDM symbols correspond to a data region to which Physical Downlink Shared Channels (PDSCHs) are allocated. Downlink control channels used in the 3GPP LTE include a Physical Control Format Indicator Channel (PCFICH), a Physical Downlink Control Channel (PDCCH), a Physical Hybrid-ARQ Indicator Channel (PHICH), and so on. The PCFICH transmitted in the first OFDM symbol of a sub-frame carries information about the number of OFDM symbols (that is, the size of a control region) which is used to transmit control channels within the sub-frame. The PHICH carries an Acknowledgement (ACK)/Not-Acknowledgement (NACK) signal for an uplink Hybrid Automatic Repeat Request (HARQ). In other words, an ACK/NACK signal for uplink data transmitted by a user equipment is transmitted on the PHICH. Control information transmitted through the PDCCH is called Downlink Control Information (DCI). The DCI indicates uplink or downlink scheduling information, an uplink transmission power control command for specific user equipment groups, etc.

FIG. 7 shows the structure of an uplink sub-frame.

The uplink sub-frame can be divided into a control region and a data region in the frequency domain. The control region is allocated with a Physical Uplink Control Channel (PUCCH) on which uplink control information is transmitted. The data region is allocated with a Physical Uplink Shared Channel (PUSCH) on which data are transmitted. To maintain the characteristic of a single carrier, a user equipment does not transmit the PUCCH and the PUSCH at the same time. The PUCCHs of one user equipment forms a RB pair within a sub-frame and are then allocated. The RBs included in the RB pair occupy different subcarriers of respective slots. It is said that a RB pair allocated to a PUCCH is frequency-hopped at the slot boundary.

The reference signals, in general, are transmitted in a sequence. A specific sequence can be used as the reference signal sequence without special restrictions. A Phase Shift Keying (PSK)-based computer-generated sequence can be used as the reference signal sequence. PSK can include, for example, Binary Phase Shift Keying (BPSK), Quadrature Phase Shift Keying (QPSK), etc. Alternatively, a Constant Amplitude Zero Auto-Correlation (CAZAC) sequence can be used as the reference signal sequence. The CAZAC sequence can include, for example, a Zadoff-Chu (ZC)-based sequence, a ZC sequence with cyclic extension, and a ZC sequence with truncation. Alternatively, a Pseudo-random (PN) sequence can be used as the reference signal sequence. The PN sequence can include, for example, m-sequence, a computer-generated sequence, a Gold sequence, and a Kasami sequence. Further, a cyclically shifted sequence can be used as the reference signal sequence.

A reference signal can be classified into a cell-specific reference signal (CRS), an MBSFN reference signal, and a user equipment-specific reference signal (UE-specific RS). The CRS is transmitted to all the UEs within a cell and used for channel estimation. The MBSFN reference signal can be transmitted in sub-frames allocated for MBSFN transmission. The UE-specific reference signal is received by a specific UE or a specific UE group within a cell, and may be referred to as a dedicated RS (DR). The DRS is chiefly used by a specific UE or a specific UE group for the purpose of data demodulation.

First, a CRS is described.

Figure 8:
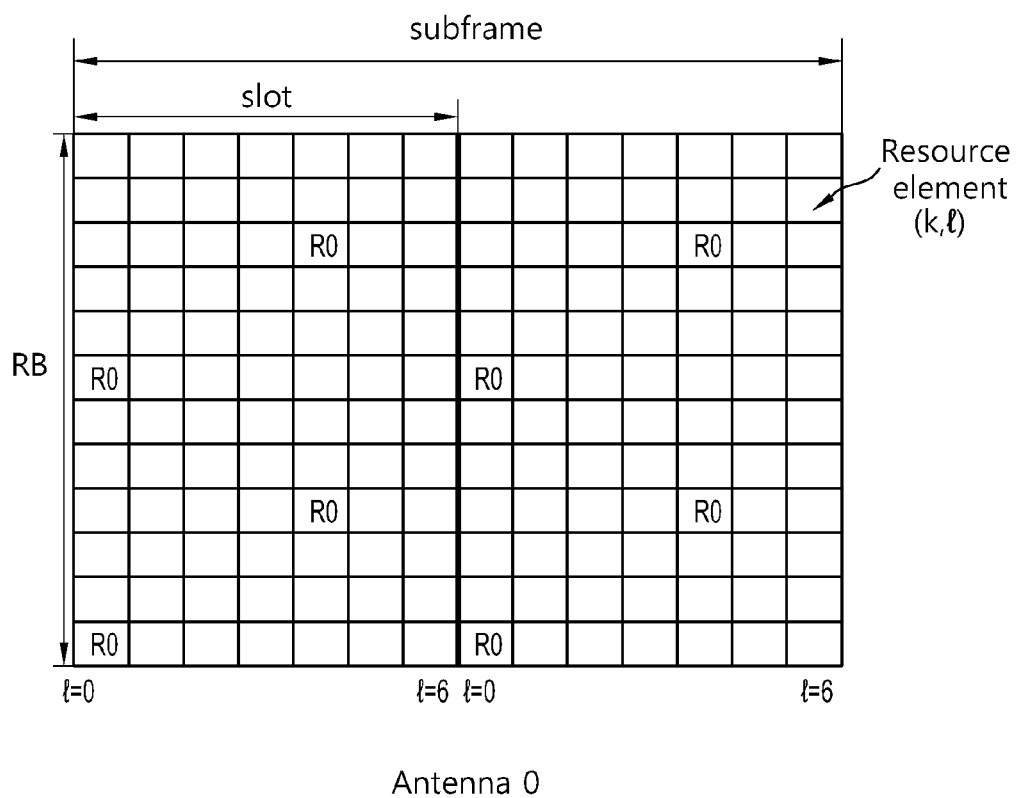
FIG. 8 shows an exemplary CRS structure when a BS uses one antenna.
Figure 9:
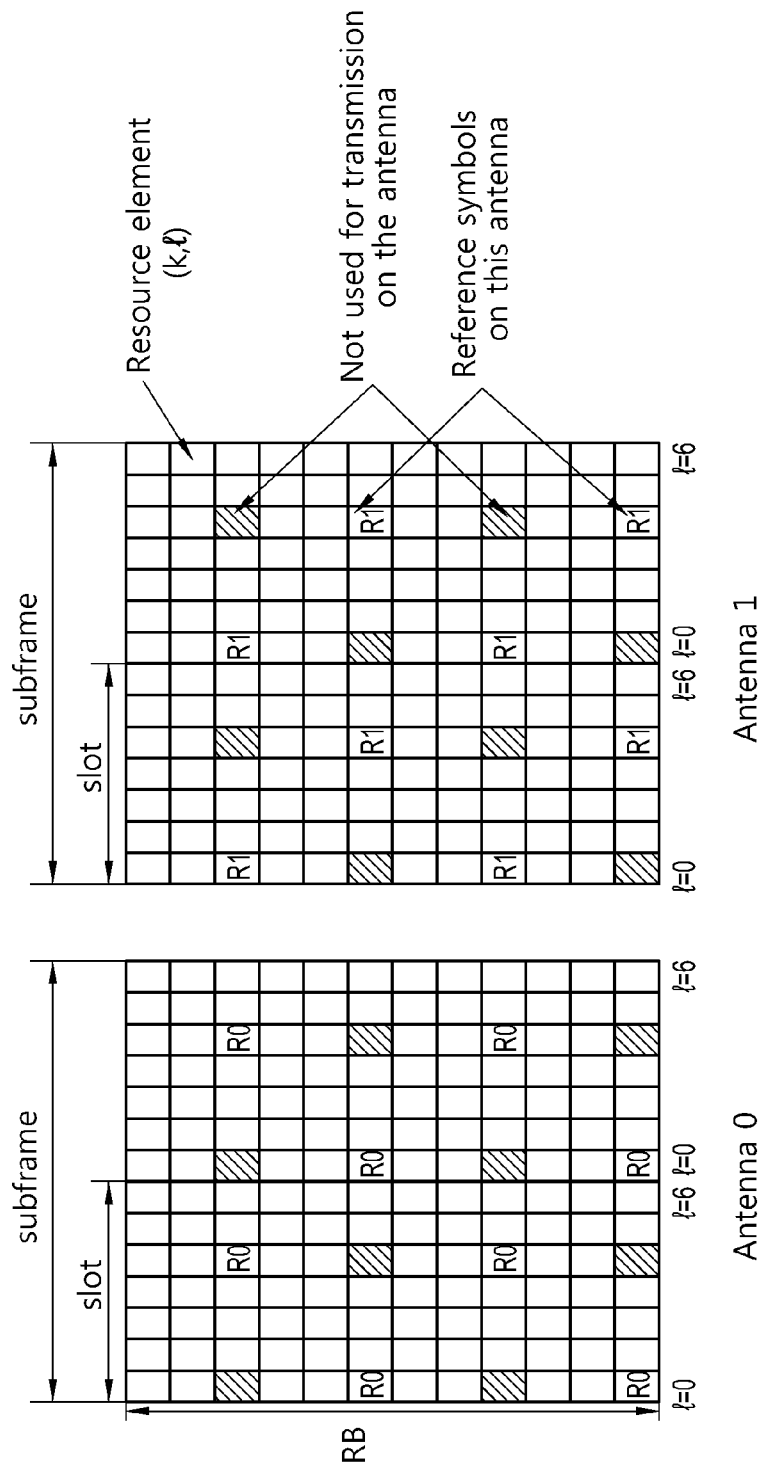
FIG. 9 shows an exemplary CRS structure when a BS uses two antennas.
Figure 10:
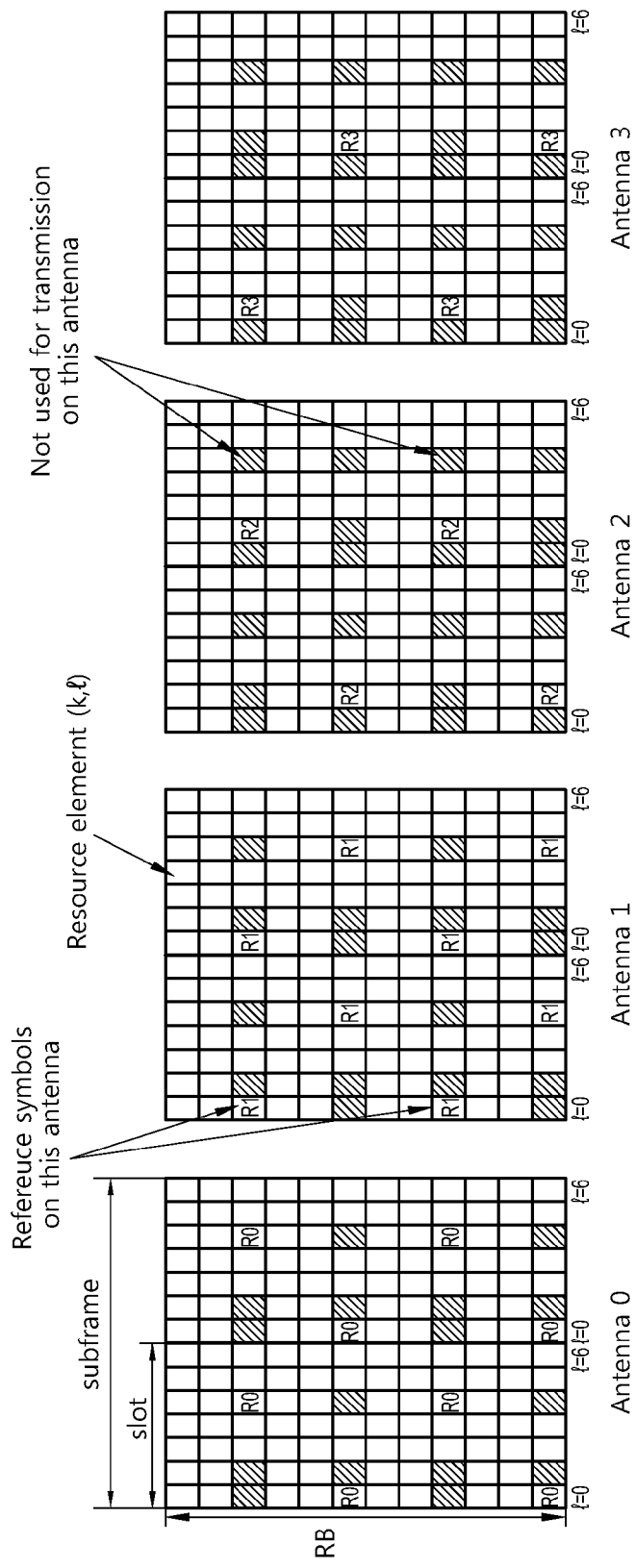
FIG. 10 shows an exemplary CRS structure when a BS uses four antennas.

FIG. 8 shows an exemplary CRS structure when a BS uses one antenna. FIG. 9 shows an exemplary CRS structure when a BS uses two antennas. FIG. 10 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc. Also, a CRS may be used for channel quality measurement, CP detection, time/frequency synchronization, etc.

Referring to FIG. 8 to FIG. 10, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index t, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2 \times N_{RB}$. Therefore, a length of the CRS sequence is $2 \times N_{RB}$.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

Herein, m is $0, 1, \ldots, 2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 3 shows an example of a gold sequence c(n).

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 3]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of $2 \times N_{RB}$ can be selected from an RS sequence generated in a length of $2 \times N_{RB,max}$.

The CRS may be used in the LTE-A system to estimate channel state information (CSI). If necessary for estimation of the CSI, channel quality indicator (CQI), a precoding matrix indicator (PMI), a rank indicator (RI), or the like may be reported from the UE. In the LTE-A system, a UE-specific RS can be use in PDSCH demodulation. Here, a PDSCH and a UE-specific RS can comply with the same precoding operation.

A DRS is described below.

Figure 11:
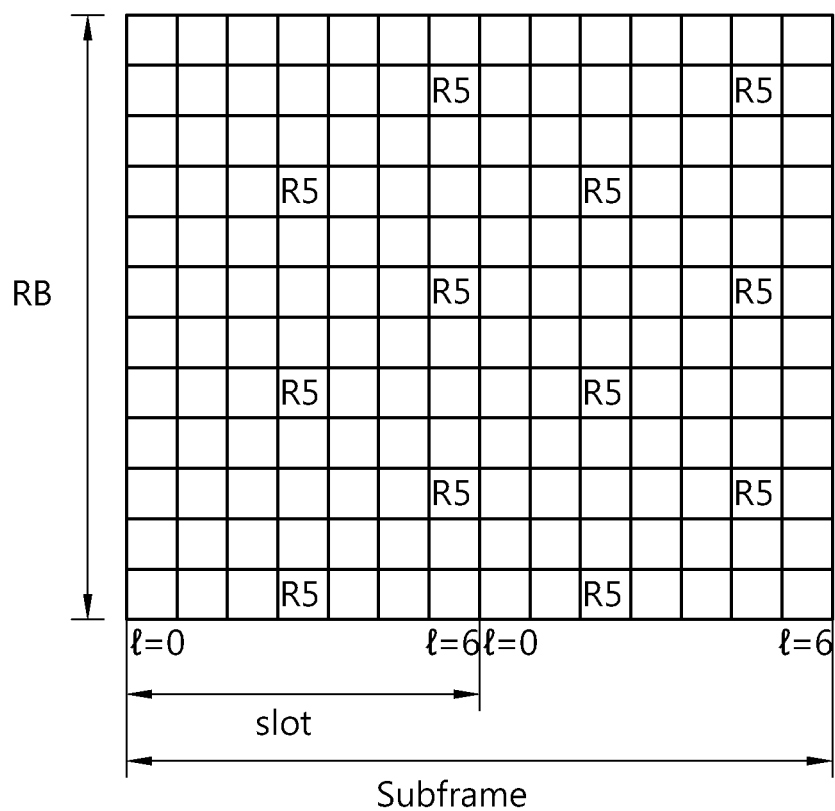
FIG. 11 shows an example of the DRS structure in the normal CP.
Figure 12:
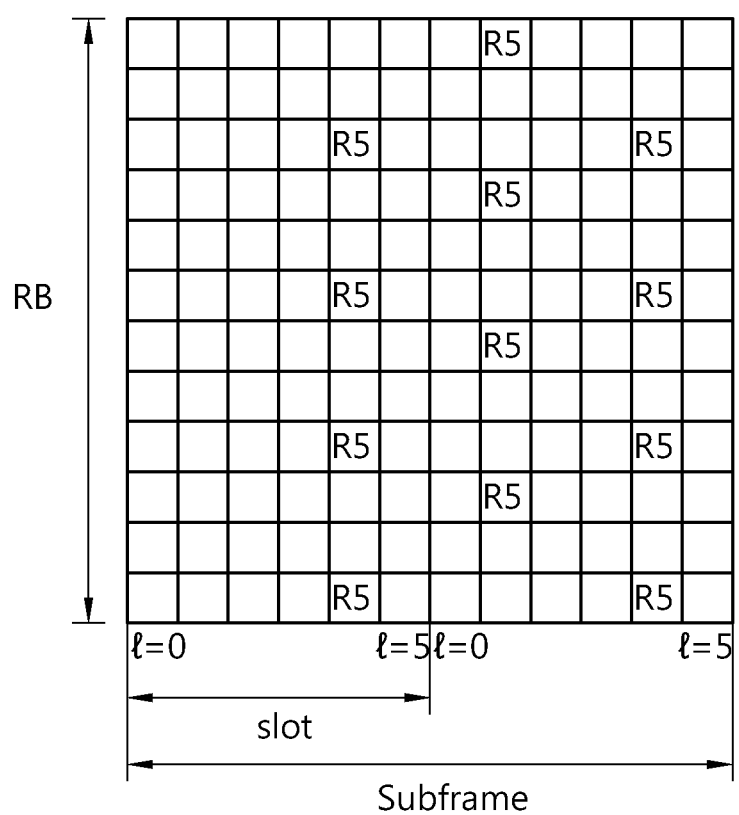
FIG. 12 shows an example of the DRS structure in the extended CP.

FIG. 11 shows an example of the DRS structure in the normal CP. In the normal CP, a subframe includes 14 OFDM symbols. R5 indicates the reference signal of an antenna which transmits a DRS. On one OFDM symbol including a reference symbol, a reference signal subcarrier is positioned at intervals of four subcarriers. FIG. 12 shows an example of the DRS structure in the extended CP. In the extended CP, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008-03).

The position of a frequency domain and the position of a time domain within the subframe of a DRS can be determined by a resource block assigned for PDSCH transmission. A DRS sequence can be determined by a UE ID, and only a specific UE corresponding to the UE ID can receive a DRS.

A DRS sequence can be obtained using Equations 2 and 3. However, m in Equation 2 is determined by $N_{RB}^{PDSCH}$. $N_{RB}^{PDSCH}$ is the number of resource blocks corresponding to a bandwidth corresponding to PDSCH transmission. The length of a DRS sequence can be changed according to $N_{RB}^{PDSCH}$. That is, the length of a DRS sequence can be changed according to the amount of data assigned to a UE. In Equation 2, a first m-sequence $x_1(i)$ or a second m-sequence $x_2(i)$ can be initialized according to a cell ID, the position of a subframe within one radio frame, a UE ID, etc. for every subframe.

A DRS sequence can be generated for every subframe and applied for every OFDM symbol. It is assumed that the number of reference signal subcarriers per resource block is 12 and the number of resource blocks is $N_{RB}^{PDSCH}$, within one subframe. The total number of reference signal subcarriers is $12 \times N_{RB}^{PDSCH}$. Accordingly, the length of the DRS sequence is $12 \times N_{RB}^{PDSCH}$. In the case in which DRS sequences are generated using Equation 2, m is $0, 1, \ldots, 12N_{RB}^{PDSCH}-1$. The DRS sequences are sequentially mapped to reference symbols. The DRS sequence is first mapped to the reference symbol and then to a next OFDM symbol, in ascending powers of a subcarrier index in one OFDM symbol.

Further, a CRS can be used together with a DRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

In case of a multi-antenna system, data can be recovered only when a reference signal for each antenna can be identified. To avoid interference between reference signals per antenna, a multiplexing scheme such as frequency division multiplexing (FDM), time division multiplexing (TDM), code division multiplexing (CDM), or the like can be used. According to the FDM, a reference signal per antenna can be transmitted by being divided in a frequency domain. According to the TDM, the reference signal per antenna can be transmitted by being divided in a time domain. According to the CDM, the reference signal per antenna can be transmitted by using a difference sequence. When reference signals are transmitted through multiple antennas by using the FDM and the TDM, reference signals for the respective antennas do not overlap with each other. In case of using the CDM, resource elements used in reference signal transmission per antenna may overlap with each other. Therefore, in case of using the CDM, a plurality of streams can be transmitted without changes in a DRS structure.

Meanwhile, to decrease overhead of the entire reference signals, an LTE-A system may use a DRS-based downlink transmission method. When using a CRS-based downlink transmission method, a system may have great overhead since a reference signal has to be always transmitted for all physical antenna ports. When using the DRS-based downlink transmission method, overhead of the reference signal can be decreased since only a virtual antenna port requires the reference signal. The number of virtual antenna ports is less than or equal to the number of physical antenna ports. The DRS can be used only for demodulation, and other reference signals can be transmitted to be used for measurement. A CSI RS for channel state measurement can be transmitted with a predetermined period, and thus the reference signal overhead can be minimized if a transmission period of the CRI RS is sufficiently long.

Figure 13:
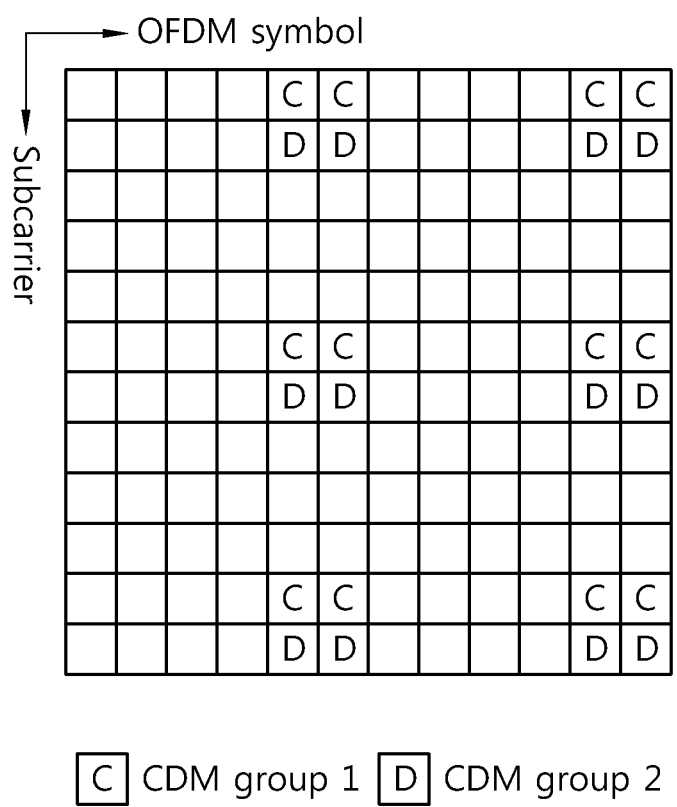
FIG. 13 shows an example of a DRS pattern in one RB of a subframe.
Figure 14:
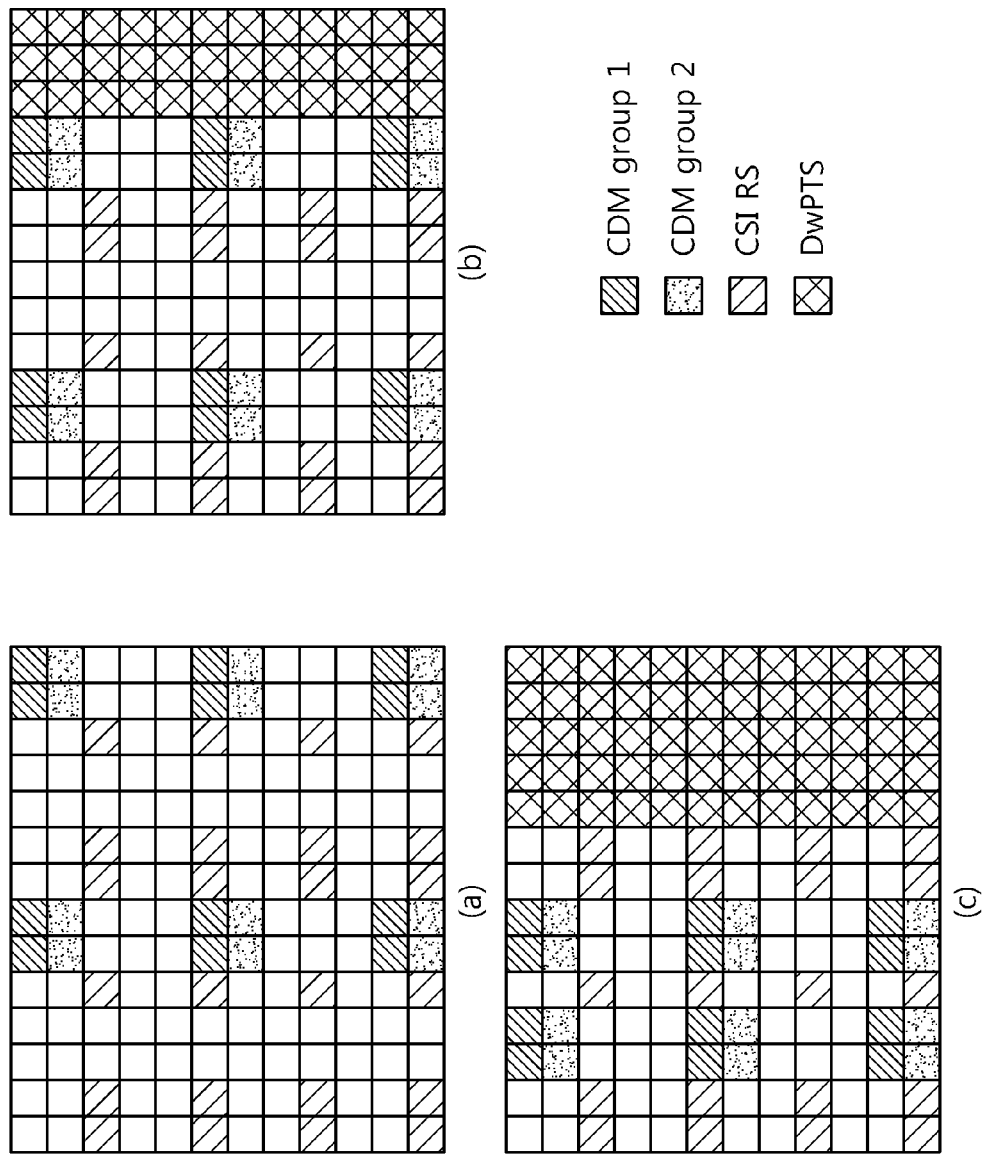
FIG. 14 shows an example of a DRS pattern according to a subframe type when using a normal CP.

FIG. 13 shows an example of a DRS pattern in one RB of a subframe. Referring to FIG. 13, two CDM groups C and D are used. The first CDM group C occupies $1^{st}$, $6^{th}$, and $11^{th}$ subcarriers of the RB. The second CDM group D occupies $2^{nd}$, $7^{th}$, and $12^{th}$ subcarriers in the RB. To multiplex up to 4 layers, two layers can be multiplexed in each CDM group. For CDM-based multiplexing, 2×2 Walsh spreading or 4×4 Walsh spreading can be used. FIG. 14 shows an example of a DRS pattern according to a subframe type when using a normal CP.

Figure 15:
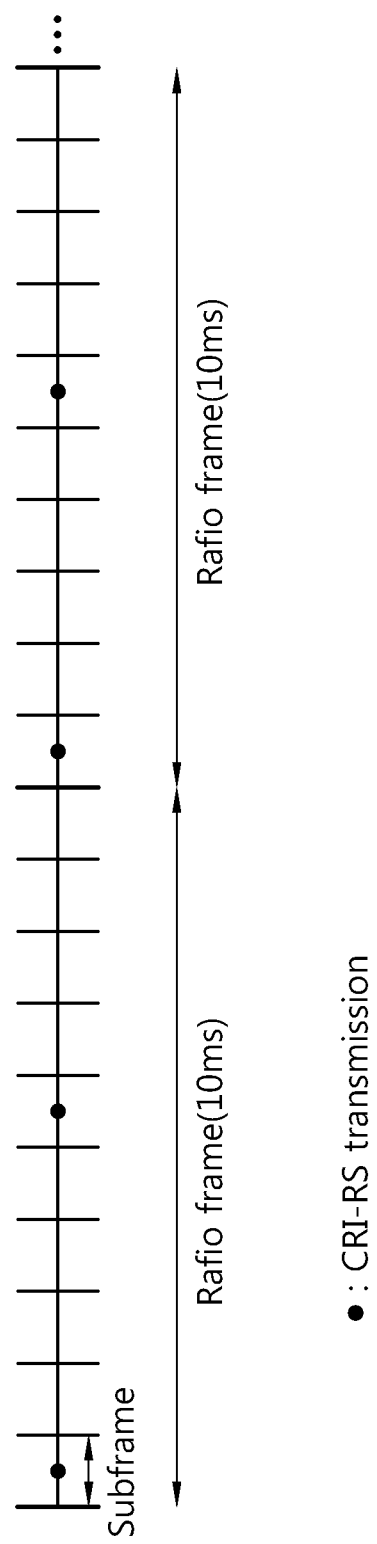
FIG. 15 shows an example of a period according to which a CSI RS is transmitted.

FIG. 15 shows an example of a period according to which a CSI RS is transmitted. To feed back a CSI to a BS, the CSI RS has to be transmitted such that a UE can measure a downlink CSI similarly to a DRS. Referring to FIG. 15, the CSI is transmitted with a period of 5 ms. The period according to which the CSI is transmitted may be greater than or less than 5 ms.

Figure 16:
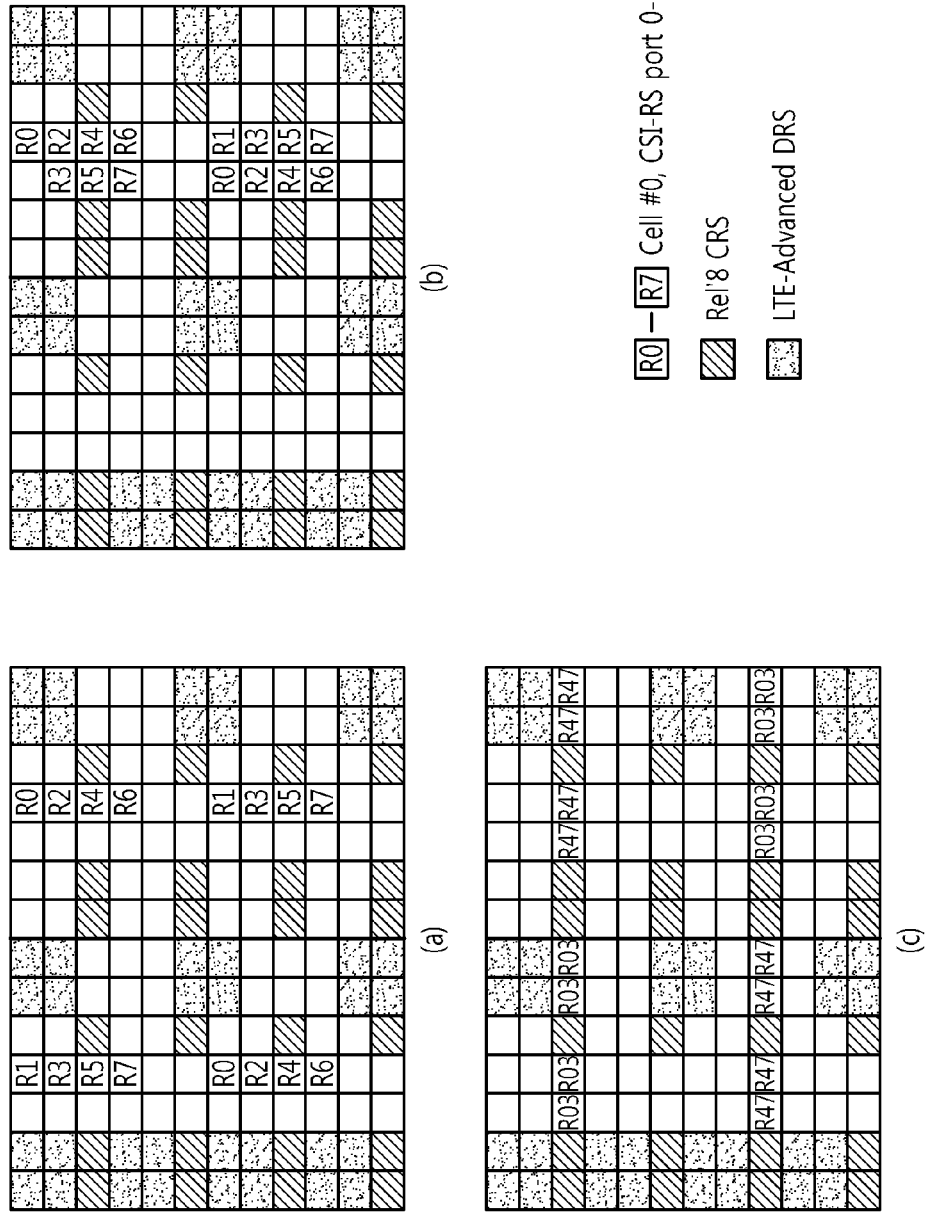
FIG. 16 shows an example of a CSI RS pattern for supporting 8 transmit antennas in an LTE-A system.

FIG. 16 shows an example of a CSI RS pattern for supporting 8 transmit antennas in an LTE-A system. A CSI RS can be transmitted by being allocated to a PDSCH region. In FIG. 16A, CSI RSs of 8 transmit antennas of a cell #0 are mapped to a $4^{th}$ OFDM symbol and an $11^{th}$ OFDM symbol. A CSI RS of each transmit antenna is mapped with a spacing of 6 subcarriers in a frequency domain. In FIG. 16B, CSI RSs of 8 transmit antennas of a cell #0 are mapped to a $10^{th}$ OFDM symbol and an $11^{th}$ OFDM symbol. A CSI RS of each transmit antenna is mapped with a spacing of 6 subcarriers in a frequency domain. In FIG. 16C, CSI RSs of 8 transmit antennas of a cell #0 are multiplexed according to CDM by constituting a group. CSI RSs of antenna ports 0 to 3 are transmitted in such a manner that the CSI RSs are multiplexed by CDM and are mapped to $3^{rd}$ and $9^{th}$ subcarriers. CSI RSs of antenna ports 4 to 7 are also transmitted in such a manner that the CSI RSs are multiplexed by CDM and are mapped to $3^{rd}$ and $9^{th}$ subcarriers.

Figure 17:
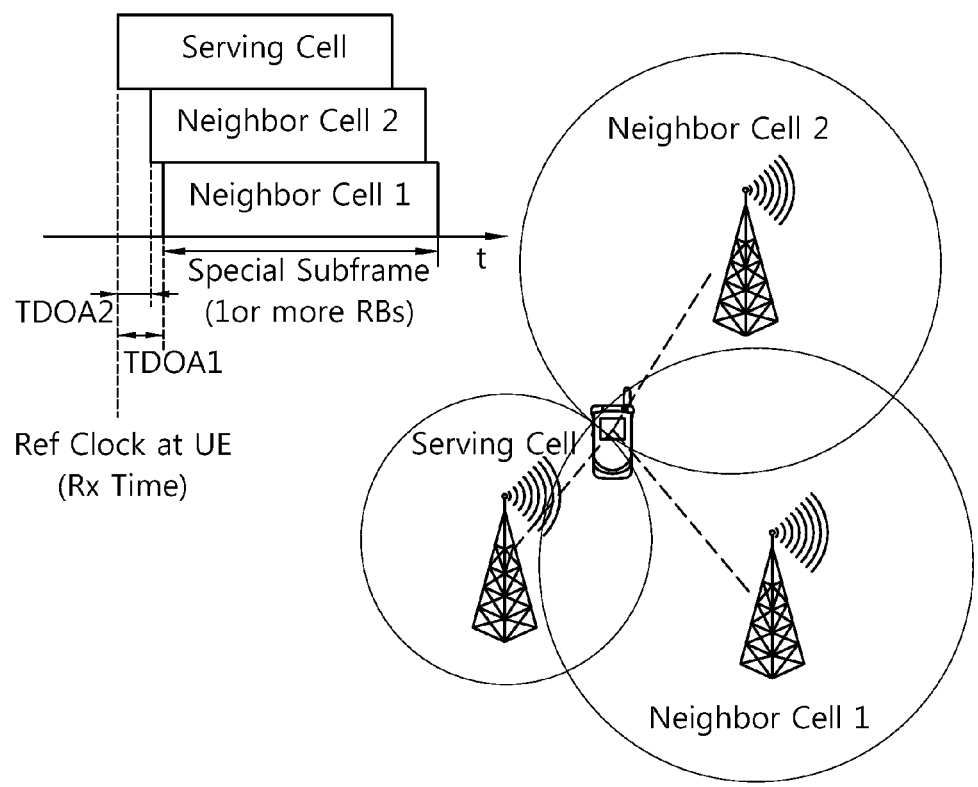
FIG. 17 shows an example of operating a downlink OTDOA scheme among terrestrial positioning-based schemes.

FIG. 17 shows an example of operating a downlink OTDOA scheme among terrestrial positioning-based schemes. A UE measures a reference clock according to a subframe transmitted from a serving cell in which the UE receives a service at the moment. A subframe is transmitted from a neighbor cell 2 at a time which elapses by a TDOA 2 from the reference clock. A subframe is transmitted from a neighbor cell 1 at a time which elapses by a TDOA 1 that is longer than the TDOA 2 from the reference block. As such, a location of the UE can be estimated according to a difference of signals transmitted from the serving cell and the neighbor cell.

Signals transmitted from the neighbor cells are received at a different TODA with respect to the signal transmitted from the serving cell.

Figure 18:
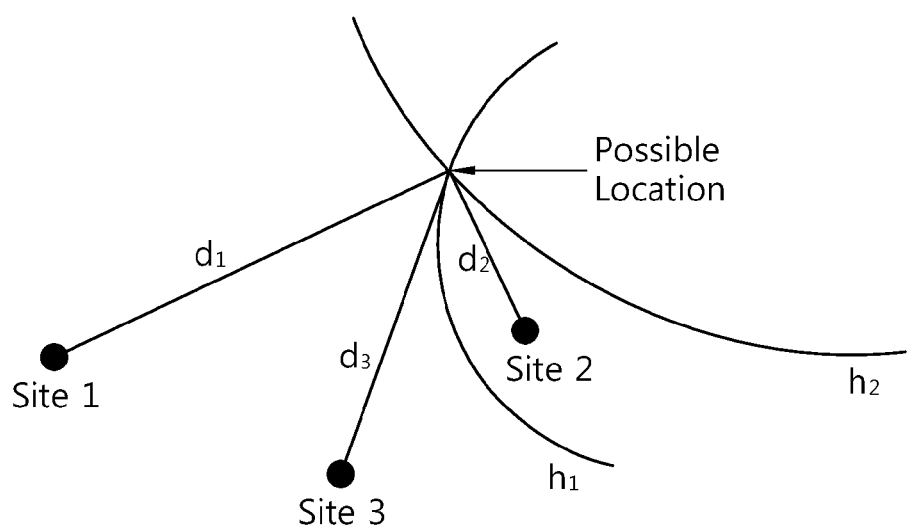
FIG. 18 shows another example of operating a downlink OTDOA scheme among terrestrial positioning-based schemes.

FIG. 18 shows another example of operating a downlink OTDOA scheme among terrestrial positioning-based schemes. A location of a UE can be estimated by a linearlized equation by using Taylor series expansion. [Y. Chan and K. Ho, "A simple and efficient estimator for hyperbolic location," IEEE Trans. Signal Processing, vol. 42, pp. 1905-1915, August 1994] may be incorporated herein by reference.

In the aforementioned UE positioning method, the UE can estimate a location by using a reference signal transmitted by a BS. The reference signal may be any one of a CRS, a primary synchronization signal (PSS), and a secondary synchronization signal (SSS). However, these signals are not enough to increase positioning performance. Therefore, a location service (LCS) RS used for the UE positioning is required.

Figure 19:
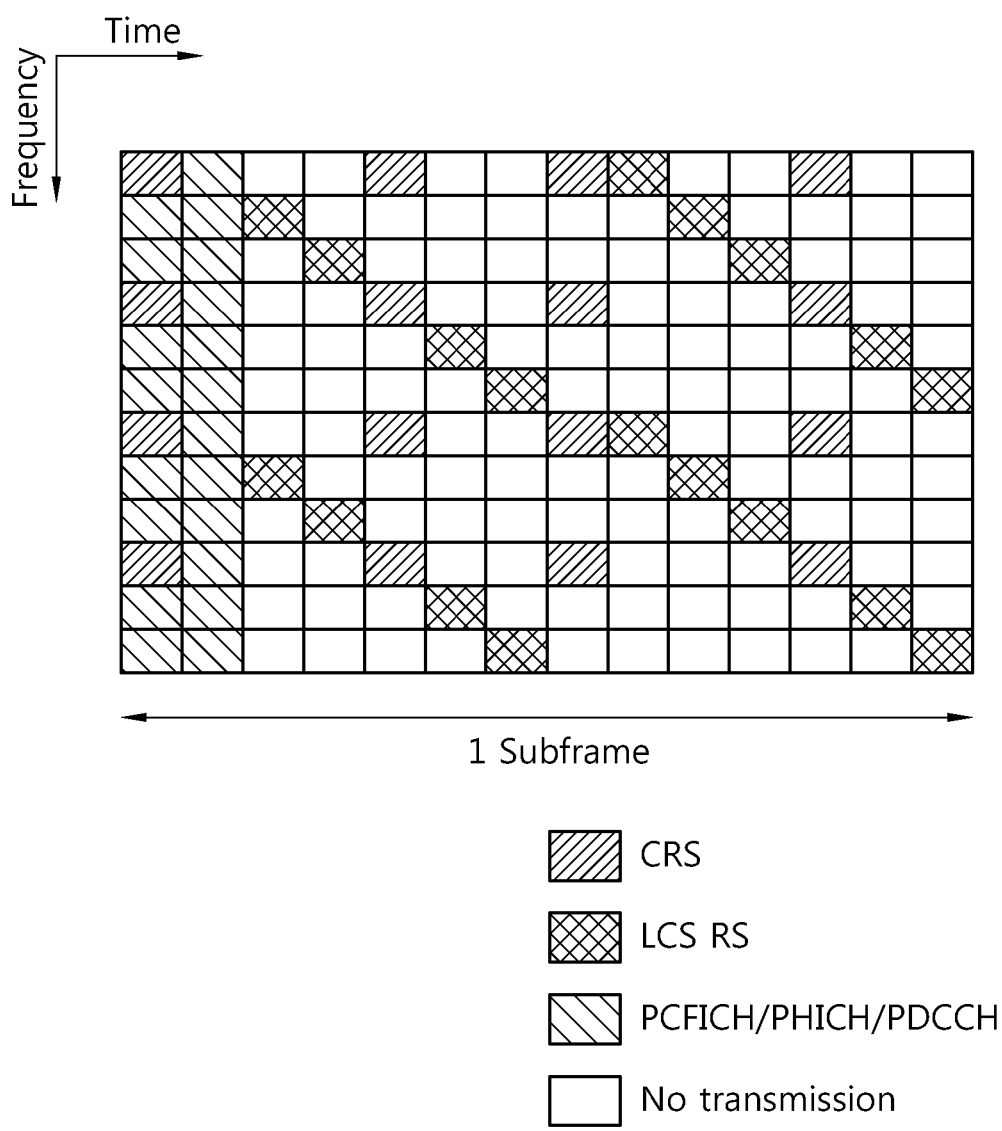
FIG. 19 shows an exemplary LCS RS structure.

FIG. 19 shows an exemplary LCS RS structure. This example shows a case of using a normal CP. A horizontal direction may indicate an OFDM symbol index in a time domain. A vertical direction may indicate a subcarrier index in a frequency domain.

Referring to FIG. 19, a $1^{st}$ OFDM symbol and a $2^{nd}$ OFDM symbol are used as a control channel such as a PCFICH, a PHICH, a PDCCH, etc. LCS RSs are allocated in a diagonal direction on a resource region starting from a $3^{rd}$ OFDM symbol. When a resource element to which the LCS RS is allocated overlaps with a resource element to which a CRS is allocated, the LCS RS can be punctured. Since the LCS RS is transmitted by being allocated in a diagonal direction, the LCS RS can be uniformly spread in a time domain and a frequency domain. Therefore, when all LCS RSs are combined in one subframe, the LCS RSs can be transmitted in all resource elements. The LCS RS may be transmitted only in a specific resource unit, or may be transmitted across a full band. Meanwhile, a neighbor cell can transmit the LCS RS by circularly shifting the LCS RS structure of FIG. 17 along a frequency axis. When the LCS RSs are transmitted from two cells to the UE, if the LCS RSs transmitted from the two cells are received with complete synchronization, inter-cell collision does not occur, and UE positioning can be correctly performed.

Figure 20:
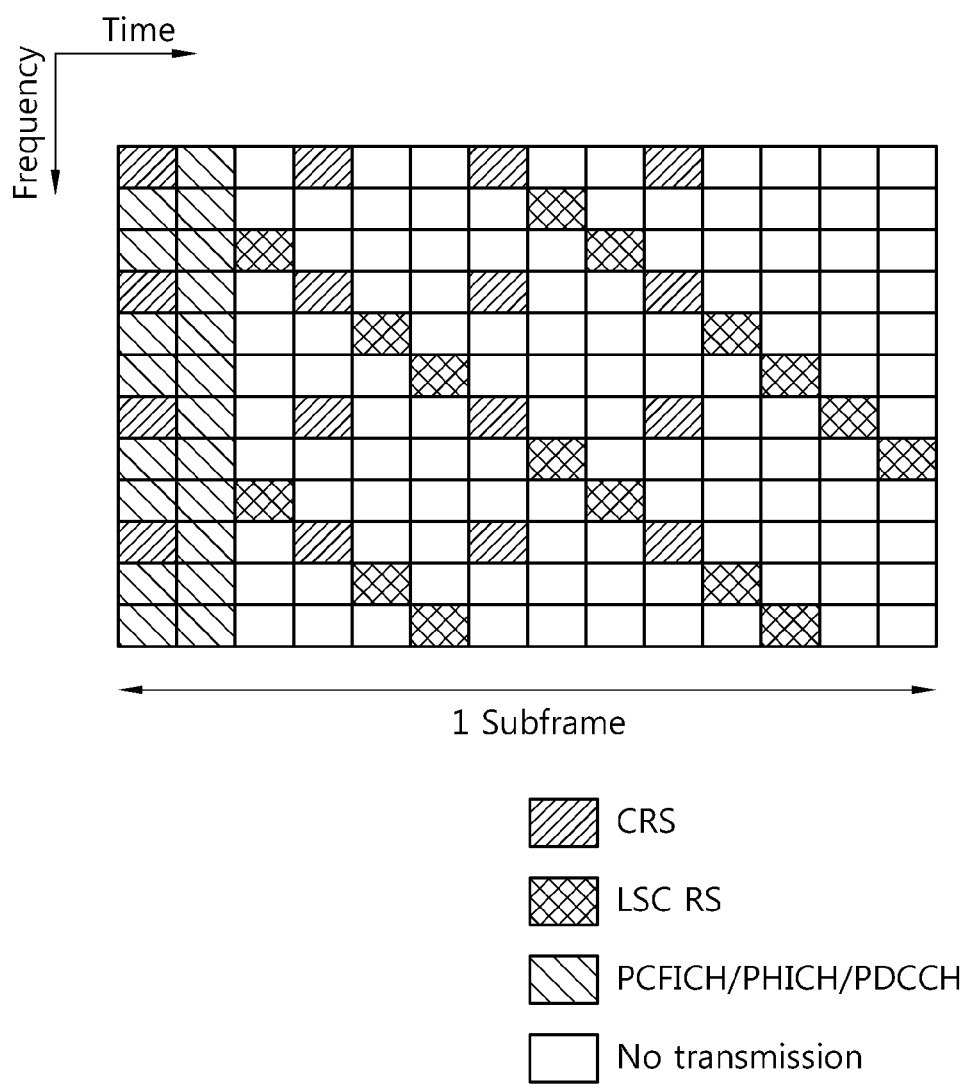
FIG. 20 shows another exemplary LCS RS structure.

FIG. 20 shows another exemplary LCS RS structure. This example shows a case of using an extended CP. A horizontal direction may indicate an OFDM symbol index in a time domain. A vertical direction may indicate a subcarrier index in a frequency domain. Referring to FIG. 20, a $1^{st}$ OFDM symbol and a $2^{nd}$ OFDM symbol are used as a control channel such as a PCFICH, a PHICH, a PDCCH, etc. Similarly to FIG. 19, LCS RSs are allocated in a diagonal direction on a resource region starting from a $3^{rd}$ OFDM symbol. When a resource element to which the LCS RS is allocated overlaps with a resource element to which a CRS is allocated, the LCS RS can be punctured.

In the UE positioning method using a reference signal, an error of UE positioning is in proportion to a bandwidth occupied by a transmitted signal. That is, the greater the bandwidth, the smaller the error of UE positioning. However, if the UE is located in a very close distance to a serving cell, a hearability problem may occur in which the UE cannot properly receive a signal transmitted from the neighbor cell due to strong transmit power of the serving cell. This is because an ADC level is determined depending on the serving cell, and signals transmitted from the neighbor cell are received with a lower level than the ADC level, and thus signals cannot be identified. To solve this problem, an idle period in downlink (IPDL) can be applied in downlink of the serving cell. The IPDL is a specific time for stopping at least one transmission among all channels of the serving cell. For example, one slot (about 667 us) per 100 ms can be allocated to the IPDL. Since there is no signal of the serving cell during the IPDL, the UE can receive a signal from neighbor cells by setting the ADC level according to signals received from the neighbor cells. In addition, a reference signal transmitted from the serving cell can be received more correctly due to the IPDL allocated to the neighbor cell. However, since the conventional CRS, DRS, synchronization signal, or the like cannot be randomly turned off for other UEs even if the IPDL is applied, deterioration of estimation performance cannot be avoided when UE positioning is performed by using these conventional signals.

Figure 21:
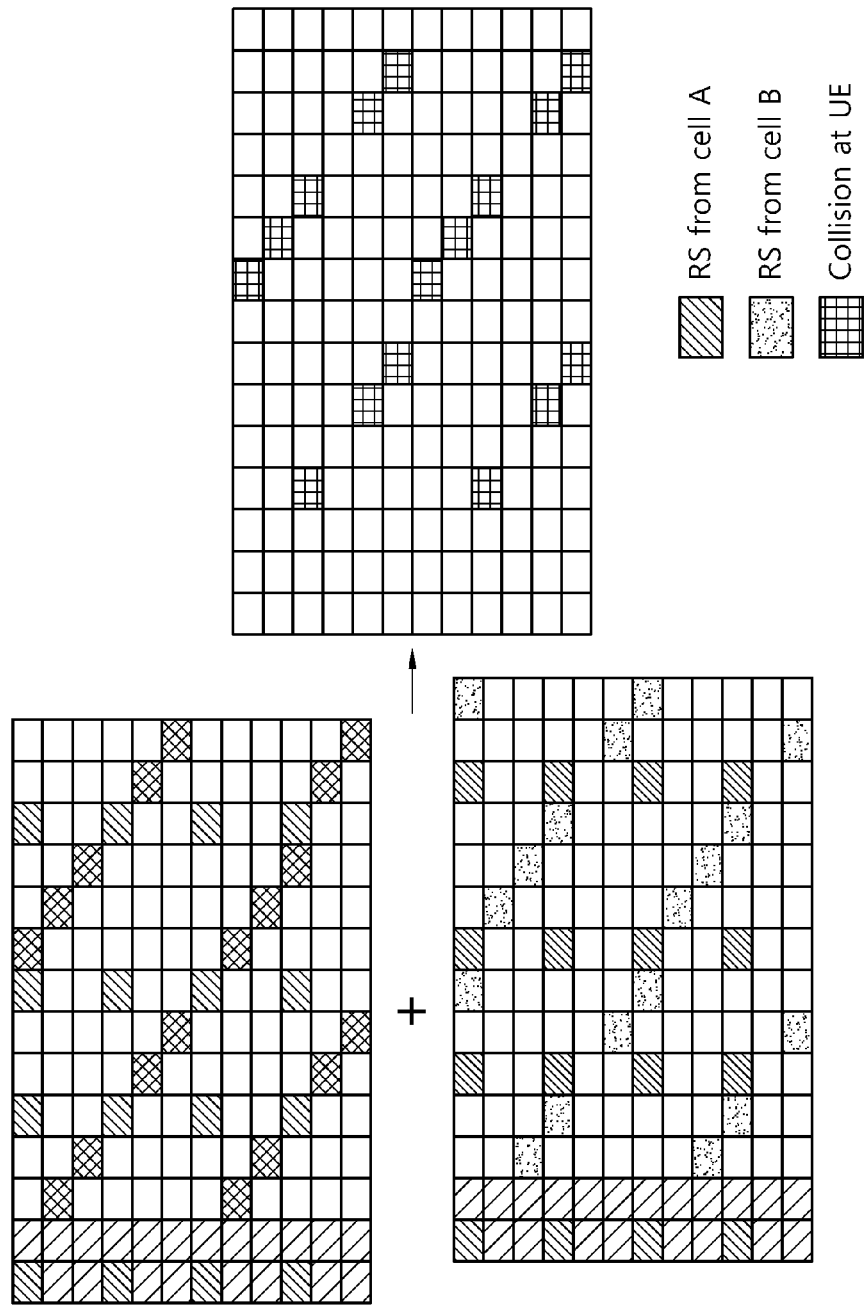
FIG. 21 shows an example of collision occurring when reception synchronization is not matched between LCS RSs transmitted from two cells.

FIG. 21 shows an example of collision occurring when reception synchronization is not matched between LCS RSs transmitted from two cells. When the LCS RSs are transmitted by being deployed in a diagonal direction on a resource region, if the reception synchronization is not matched between the LCS RSs transmitted from the two cells, there is a risk that collision may occur in all LCS RSs. Referring to FIG. 21, a subframe of a cell B is transmitted with a delay of one OFDM symbol with respect to a subframe of a cell A. When synchronization is matched between the subframe transmitted from the cell A and the subframe transmitted from the cell B, a UE can receive all LCS RSs transmitted from the two cells. However, when the reception synchronization is mismatched as shown in FIG. 21, most of LCS RSs overlap when transmitted, and thus it is difficult to correctly perform UE positioning. This problem is common not only for the LCS RS but also for a normal reference signal or a reference signal of cooperative multi-point (CoMP) transmission.

The proposed reference signal transmission method will be described hereinafter according to embodiments of the present invention. Even if reception synchronization is mismatched between LCS RSs transmitted from a plurality of cells according to the proposed invention, an LCS RS structure that minimizes collision between the LCS RSs can be proposed. In addition, the present invention is applicable not only to the LCS RS but also to all RSs such as a CRS, a DRS, a channel state information (CSI) RS, a CoMP RS, a sounding RS, etc.

First, it is assumed that a reference signal is transmitted for single-antenna transmission. Herein, the single-antenna transmission includes not only a case where one physical antenna is present but also a case of applying a scheme (e.g., small delay CDD, PVS, antenna switching, etc) in which several antennas are recognized as one antenna through virtualization. The proposed invention is also applicable to a reference signal for multi-antenna transmission.

Figure 22:
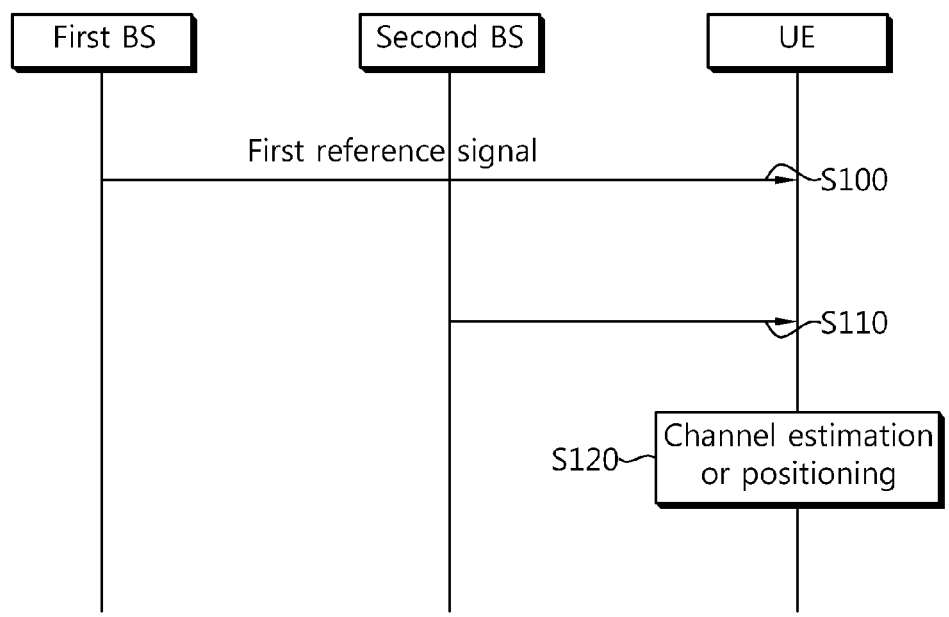
FIG. 22 shows the proposed reference signal transmission method according to an embodiment of the present invention.

FIG. 22 shows the proposed reference signal transmission method according to an embodiment of the present invention.

In step S100, a $1^{st}$ BS transmits a $1^{st}$ reference signal to a UE. In step S110, a $2^{nd}$ BS transmits a $2^{nd}$ reference signal to the UE.

The $1^{st}$ reference signal can be transmitted by constituting a $1^{st}$ reference signal structure depending on a time domain and a frequency domain on a resource region. The $2^{nd}$ reference signal can be transmitted by constituting a $2^{nd}$ reference signal structure depending on a time domain and a frequency domain on a resource region. In this case, the $1^{st}$ reference signal structure and the $2^{nd}$ reference signal structure can be expressed as a part of a 2-dimensional matrix when a dimension consists of the time domain and the frequency domain. A row index of the 2-dimensional matrix may be the entirety or part of a frequency index. A column index of the 2-dimensional matrix may be the entirety or part of an OFDM symbol index. The row index and the column index can be swapped.

When the $1^{st}$ reference signal structure and the $2^{nd}$ reference signal structure are expressed as a part of the 2-dimensional matrix, the 2-dimensional matrix may have a Latin square format. When a square array consisting of n rows and n columns are filled with n different symbols, each occurring exactly once in each row and column, this is called an order-n Latin square. If the number of order-n Latin squares is $I_n$, then $I_1=I_2=I_3=1$, $I_4=4$, $I_5=56$, $I_6=9408$, $I_7=16942080$. In addition, $n!(n-1)!I_n$ different Latin squares can be obtained by swapping the row and column in $I_n$ standard squares.

Equation 4 shows an example of an order-4 Latin square.

$$\begin{pmatrix} 1 & 2 & 3 & 4 \\ 3 & 4 & 1 & 2 \\ 2 & 1 & 4 & 3 \\ 4 & 3 & 2 & 1 \end{pmatrix} \quad \text{[Equation 4]}$$

Equation 5 shows another example of the order-4 Latin square.

$$\begin{pmatrix} 1 & 2 & 3 & 4 \\ 2 & 4 & 1 & 3 \\ 3 & 1 & 4 & 2 \\ 4 & 3 & 2 & 1 \end{pmatrix} \quad \text{[Equation 5]}$$

When determining a reference signal structure by which a reference signal is transmitted, a size of the Latin square can be determined to be N×N. In addition, Np can be determined randomly. For example, Np=N. Alternatively, Np may be an integer less than or greater than N. Alternatively, Np may be the greatest prime number less than N, or may be the smallest prime number greater than N.

When a cell ID index of a cell for transmitting the reference signal is denoted by m(m=0, 1, ..., $N_{cellID}-1$) and an OFDM symbol index is denoted by n, a frequency index k can be determined by Equation 6. Alternatively, when a plurality of antennas are present, m may be an antenna port index. When there are a plurality of cells and a plurality of antennas, m can be determined exclusively for each cell and antenna.

$$k_n^m = \mod(\mod(a^m \cdot b + c, N_p) + d, N) \quad \text{[Equation 6]}$$

Referring to Equation 6, k can be determined to a value obtained by performing a modulo operation between any linear equation and any value Np. A modulo operation 'mod (a,b)' is a remainder obtained after dividing 'a' by 'b'.

Alternatively, the frequency index k can be determined by Equation 7.

$$k_n^m = \mod(a^m \cdot b + c, N_p) + d \quad \text{[Equation 7]}$$

In Equation 6 or Equation 7, 'a' may be an inclination of ab+c, and 'd' may be any integer. When 'a' is the inclination, the inclination may be a function of a cell ID or a function of a reuse factor. Some of elements of a matrix generated by Equation 6 or Equation 7 may be punctured for a specific purpose.

As a detailed example of Equation 6 or Equation 7, the frequency index k may be determined by Equation 8. This shows a case where Equation 6 or Equation 7 is applied to an LTE or LTE-A system.

$$k_n^m = \mod(\mod(a^m \cdot (n+1), N_p) - 1 + n_{subblock}, N)$$

$$n = 0, 1, \ldots, N_{sym} - 1$$

$$n_{subblock} = 0, 1, \ldots, N_{subblock} - 1 \qquad \text{[Equation 8]}$$

In Equation 8, $N_{sym}$ may be the number of OFDM symbols in one subframe, and $N_{subblock}$ may be the number of N×N-sized matrices within a specific range. When a subblock is generated on a subframe basis, a subblock index $n_{subblock}$ may be a subframe index $n_{SF}$. Although $n_{SF}$ may have the same value for all subframes, it is assumed herein that $n_{SF}$ has a different value. In addition, $n_{subblock}$ specifies a hopping pattern based on a specific unit, and can be defined as a function of a cell ID as well as $n_{SF}$. For example, $n_{subblock}$ can be defined such as $n_{subblock} = n_{SF} + \text{cellID}$, so that a reference signal structure can be hopped for each subframe by being associated with a cell ID.

$a^m$ may be a function of a cell ID, and is assumed that d=−1. The cell ID may be a reused cell ID. For example, if the number of cell IDs is 504, the cell ID applied in the present invention can be expressed by $m = \mod(n_{cellID}, N)$ when the cell ID is reused (i.e., reuse factor=N).

Allocation of a reference signal to each cell by applying the proposed invention in case of N=4 (i.e., reuse factor=4) will be described.

Equation 9 shows an example of a 2-dimensional matrix to which the proposed invention is applied.

$$\begin{pmatrix} 0 & 2 & 1 & 3 \\ 1 & 0 & 3 & 2 \\ 2 & 3 & 0 & 1 \\ 3 & 1 & 2 & 0 \end{pmatrix} \qquad \text{[Equation 9]}$$

In a matrix of Equation 9, a row may represent a frequency index. In addition, a column may represent an OFDM symbol index. Each element constituting the matrix may be a cell ID or a part of the cell ID. When each element is the part of the cell ID, each element may be mod(cell ID, $N_{reuse}$) or mod(cell ID, N). For example, if the cell ID has values 0 to 503 and N=6, a cell having a cell ID of 100 can be expressed by mod(100,6)=4. Referring to Equation 9, a cell having a cell ID of 0 (m=0) transmits a reference signal in a resource element (k,n)=(0,0), (1,1), (2,2), (3,3). A cell having a cell ID of 1 (m=1) transmits a reference signal in a resource element (k,n)=(1,0), (3,1), (0,2), (2,3). A cell having a cell ID of 2 (m=2) transmits a reference signal in a resource element (k,n)=(2,0), (0,1), (3,2), (1,3). A cell having a cell ID of 3 (m=3) transmits a reference signal in a resource element (k,n)=(3,0), (2,1), (1,2), (0,3).

Figure 23:
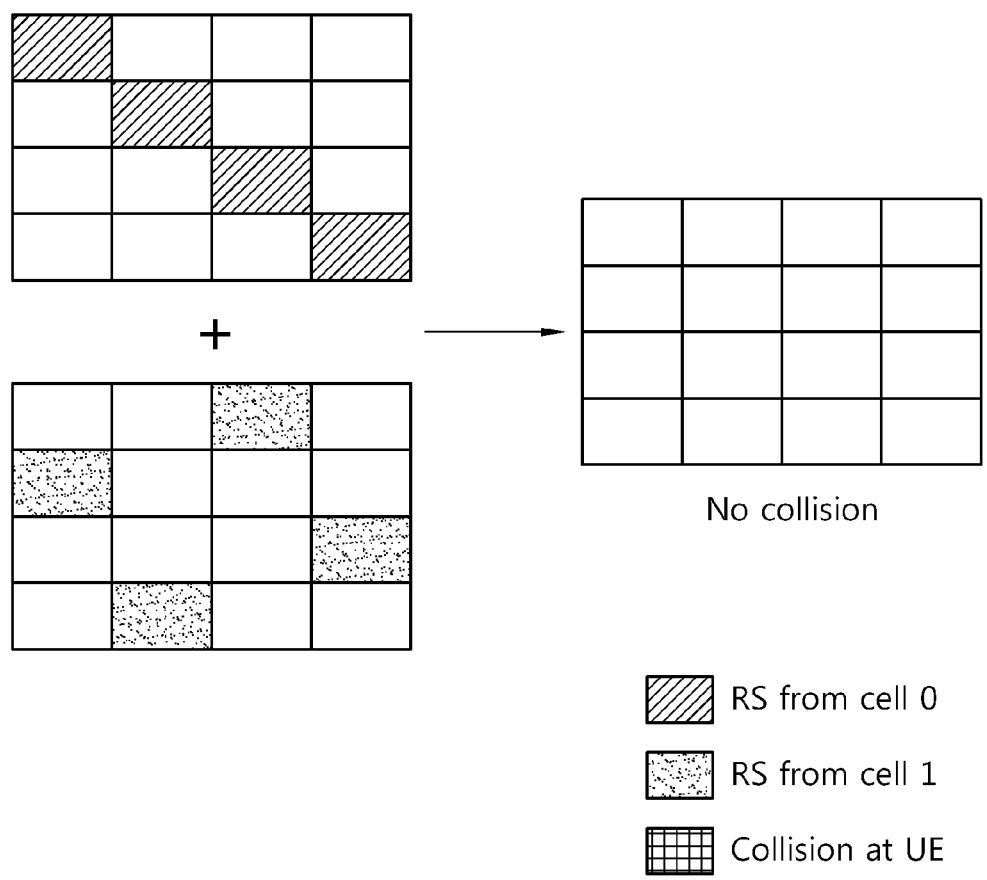
FIG. 23 shows a case where reference signals are transmitted from two cells according to the proposed reference signal transmission method.

FIG. 23 shows a case where reference signals are transmitted from two cells according to the proposed reference signal transmission method. When transmitting subframes from a cell 0 and a cell 1, synchronization is matched in a UE. Since a $1^{st}$ reference signal transmitted from the cell 0 and a $2^{nd}$ reference signal transmitted from the cell 1 are transmitted by constituting a Latin square as described above, the $1^{st}$ reference signal and the $2^{nd}$ reference signal do not collide with each other.

Figure 24:
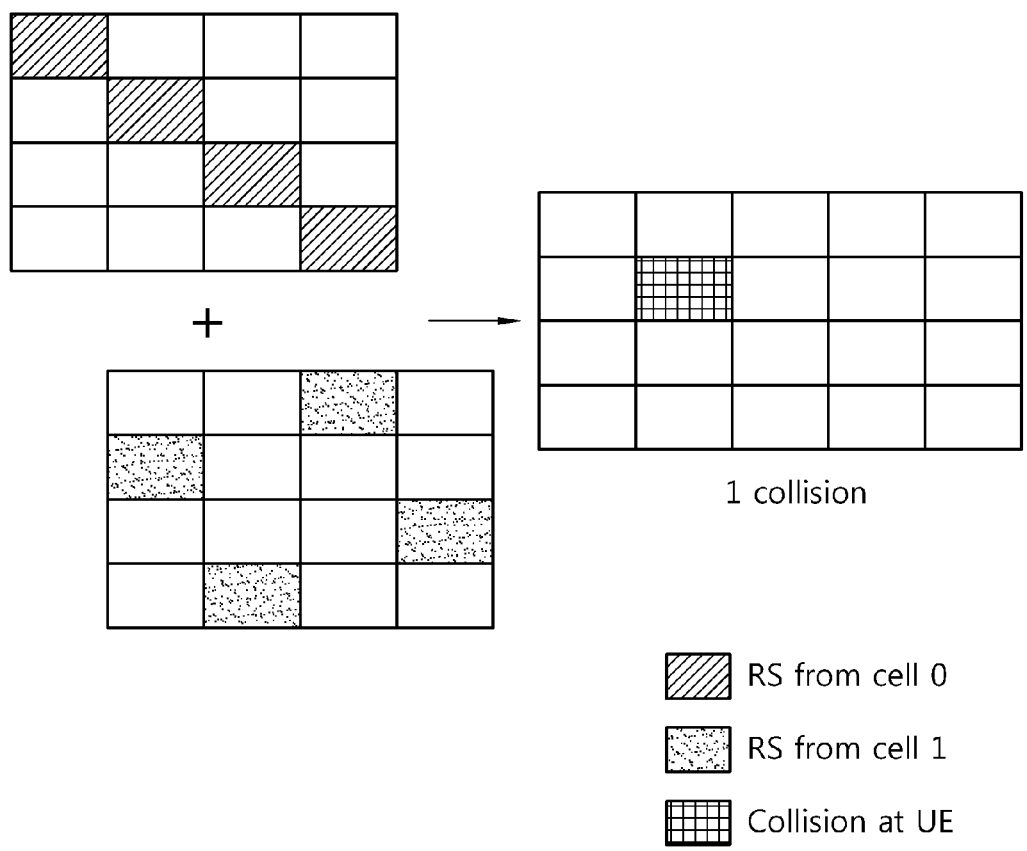
FIG. 24 shows another example of a case where reference signals are transmitted from two cells according to the proposed reference signal transmission method.

FIG. 24 shows another example of a case where reference signals are transmitted from two cells according to the proposed reference signal transmission method. When transmitting subframes from a cell 0 and a cell 1, synchronization is mismatched by one OFDM symbol. In this case, a $1^{st}$ reference signal transmitted from the cell 0 and a $2^{nd}$ reference signal transmitted from the cell 1 collide only once. This is because the $1^{st}$ reference signal and the $2^{nd}$ reference signal are transmitted by constituting a Latin square from each other. Therefore, since collision between reference signals is minimized, the UE can receive a great number of reference signals to perform channel estimation or UE positioning with excellent performance.

In addition, one or more rows or columns can be permutated or circularly shifted in a matrix generated by applying the proposed method to generate a new matrix. Permutation or circular shift can be performed on the remaining rows and columns by fixing any one of the rows or columns. Accordingly, (N−1)! new matrices can be generated. Each cell can be transmitted by deploying reference signals on the basis of the generated new matrix.

Equation 10 shows another example of the 2-dimensional matrix to which the proposed invention is applied.

$$\begin{pmatrix} 0 & 1 & 2 & 3 \\ 1 & 3 & 0 & 2 \\ 2 & 0 & 3 & 1 \\ 3 & 2 & 1 & 0 \end{pmatrix} \qquad \text{[Equation 10]}$$

A matrix of Equation 10 has a format in which a $2^{nd}$ column and a $3^{rd}$ column of the matrix of Equation 9 are swapped.

Equation 11 shows another example of the 2-dimensional matrix to which the proposed invention is applied.

$$\begin{pmatrix} 0 & 3 & 2 & 1 \\ 1 & 2 & 0 & 3 \\ 2 & 1 & 3 & 0 \\ 3 & 0 & 1 & 2 \end{pmatrix} \qquad \text{[Equation 11]}$$

A matrix of Equation 11 is generated in such a manner that while fixing a $1^{st}$ column of the matrix of Equation 9, the remaining columns are shifted by 1 to the left.

Equation 12 shows another example of the 2-dimensional matrix to which the proposed invention is applied.

$$\begin{pmatrix} 0 & 2 & 1 & 3 & 4 & 7 & 6 & 5 \\ 1 & 0 & 3 & 2 & 5 & 6 & 4 & 7 \\ 2 & 3 & 0 & 1 & 6 & 5 & 7 & 4 \\ 3 & 1 & 2 & 0 & 7 & 4 & 5 & 6 \end{pmatrix} \qquad \text{[Equation 12]}$$

A matrix of Equation 12 is a 4×8 matrix obtained by combining the matrix of Equation 9 and a matrix generated by adding 4 to each of elements constituting the matrix of Equation 11. By extending the matrix in this manner, a reference signal structure having a reuse factor 4 can be extended to a reference signal structure having a reuse factor 8.

Equation 13 shows another example of the 2-dimensional matrix to which the proposed invention is applied.

$$\begin{pmatrix} 3 & 1 & 2 & 0 \\ 0 & 2 & 1 & 3 \\ 1 & 0 & 3 & 2 \\ 2 & 3 & 0 & 1 \end{pmatrix} \qquad \text{[Equation 13]}$$

A matrix of Equation 13 is a generated by cyclically shifting each row of the matrix of Equation 9 by 1.

Equation 14 shows another example of the 2-dimensional matrix to which the proposed invention is applied.

$$\begin{pmatrix} 0 & 2 & 1 & 3 & 7 & 5 & 6 & 4 \\ 1 & 0 & 3 & 2 & 4 & 6 & 5 & 7 \\ 2 & 3 & 0 & 1 & 5 & 4 & 7 & 6 \\ 3 & 1 & 2 & 0 & 6 & 7 & 4 & 5 \end{pmatrix} \quad [\text{Equation 14}]$$

A matrix of Equation 14 is a 4×8 matrix obtained by combining the matrix of Equation 9 and a matrix generated by adding 4 to each of elements constituting the matrix of Equation 13. By extending the matrix in this manner, a reference signal structure having a reuse factor 4 can be extended to a reference signal structure having a reuse factor 8.

Equation 15 shows another example of the 2-dimensional matrix to which the proposed invention is applied.

$$\begin{pmatrix} 0 & 5 & 3 & 2 & 8 & 1 & 7 & 6 \\ 1 & 0 & 7 & 5 & 6 & 3 & 4 & 2 \\ 2 & 6 & 0 & 8 & 4 & 5 & 1 & 9 \\ 3 & 1 & 4 & 0 & 2 & 7 & 9 & 5 \\ 4 & 7 & 8 & 3 & 0 & 9 & 6 & 1 \\ 5 & 2 & 1 & 6 & 9 & 0 & 3 & 8 \\ 6 & 8 & 5 & 9 & 7 & 2 & 0 & 4 \\ 7 & 3 & 9 & 1 & 5 & 4 & 8 & 0 \end{pmatrix} \quad [\text{Equation 15}]$$

Equation 16 shows another example of the 2-dimensional matrix to which the proposed invention is applied. A matrix of Equation 16 is generated by puncturing an element having a value other than 0 to 7 in the matrix of Equation 15.

$$\begin{pmatrix} 0 & 5 & 3 & 2 & x & 1 & 7 & 6 \\ 1 & 0 & 7 & 5 & 6 & 3 & 4 & 2 \\ 2 & 6 & 0 & x & 4 & 5 & 1 & x \\ 3 & 1 & 4 & 0 & 2 & 7 & x & 5 \\ 4 & 7 & x & 3 & 0 & x & 6 & 1 \\ 5 & 2 & 1 & 6 & x & 0 & 3 & x \\ 6 & x & 5 & x & 7 & 2 & 0 & 4 \\ 7 & 3 & x & 1 & 5 & 4 & x & 0 \end{pmatrix} \quad [\text{Equation 16}]$$

In Equation 16, a punctured part may not receive a signal or may receive other data or other types of reference signal.

If N+1 is not a prime number, an N×N-sized Latin square can be configured by performing a modulo operation for all matrix elements within a range of 0 to N−1. In this case, a new matrix can be configured by using a specific row and column.

Equation 17 shows an example of a Latin square matrix having a size of 10×10.

$$\begin{pmatrix} 0 & 5 & 3 & 2 & 8 & 1 & 7 & 6 & 4 & 9 \\ 1 & 0 & 7 & 5 & 6 & 3 & 4 & 2 & 9 & 8 \\ 2 & 6 & 0 & 8 & 4 & 5 & 1 & 9 & 3 & 7 \\ 3 & 1 & 4 & 0 & 2 & 7 & 9 & 5 & 8 & 6 \\ 4 & 7 & 8 & 3 & 0 & 9 & 6 & 1 & 2 & 5 \\ 5 & 2 & 1 & 6 & 9 & 0 & 3 & 8 & 7 & 4 \\ 6 & 8 & 5 & 9 & 7 & 2 & 0 & 4 & 1 & 3 \\ 7 & 3 & 9 & 1 & 5 & 4 & 8 & 0 & 6 & 2 \\ 8 & 9 & 2 & 4 & 3 & 6 & 5 & 7 & 0 & 1 \\ 9 & 4 & 6 & 7 & 1 & 8 & 2 & 3 & 5 & 0 \end{pmatrix} \quad [\text{Equation 17}]$$

An 8×8-sized Latin square matrix can be generated from the 10×10-sized matrix of Equation 17. In this case, a new matrix can be generated by using a $9^{th}$ row and a $9^{th}$ column. That is, the new matrix can be generated by performing a modulo operation on the sum N of corresponding elements.

Equation 18 shows an 8×8 matrix generated based on Equation 17 above.

$$\begin{pmatrix} 4 & 5 & 6 & 0 & 7 & 2 & 1 & 3 \\ 1 & 2 & 3 & 5 & 4 & 7 & 6 & 0 \\ 3 & 4 & 5 & 7 & 6 & 1 & 0 & 2 \\ 0 & 1 & 2 & 4 & 3 & 6 & 5 & 7 \\ 2 & 3 & 4 & 6 & 5 & 0 & 7 & 1 \\ 7 & 0 & 1 & 3 & 2 & 5 & 4 & 6 \\ 1 & 2 & 3 & 5 & 4 & 7 & 6 & 0 \\ 6 & 7 & 0 & 2 & 1 & 4 & 3 & 5 \end{pmatrix} \quad [\text{Equation 18}]$$

When generating the matrix of Equation 18 from Equation 17 above, an element (i,j) is determined by mod(a(8,i)+a(j,8),8). For example, an element corresponding to (0,0) may be determined by mod(a(8,0)+a(0,8),8)=mod(8+4,8)=4, and an element corresponding to (0,1) may be determined by mod(a(8,1)+a(0,8),8)=mod(9+4,8)=5. When generating a matrix in this manner, the matrix can be generated by using a combination of a $9^{th}$ row and a $9^{th}$ column, or the matrix can be generated by using any one of a combination of the $9^{th}$ row-the $10^{th}$ row, a combination of a $10^{th}$ row and the $9^{th}$ column, and a combination of the $10^{th}$ row and the $10^{th}$ column.

When the matrix is generated in this manner, an N×N-sized Latin square matrix can be generated without puncturing. In this case, collision may occur between reference signals up to two times with respect to all timing differences.

Equation 19 shows another example of the 2-dimensional matrix to which the proposed invention is applied. In this case, N=12.

$$\begin{pmatrix} 0 & 6 & 8 & 9 & 7 & 10 & 1 & 4 & 2 & 3 & 5 & 11 \\ 1 & 0 & 4 & 6 & 2 & 8 & 3 & 9 & 5 & 7 & 11 & 10 \\ 2 & 7 & 0 & 3 & 10 & 6 & 5 & 1 & 8 & 11 & 4 & 9 \\ 3 & 1 & 9 & 0 & 5 & 4 & 7 & 6 & 11 & 2 & 10 & 8 \\ 4 & 8 & 5 & 10 & 0 & 2 & 9 & 11 & 1 & 6 & 3 & 7 \\ 5 & 2 & 1 & 7 & 8 & 0 & 11 & 3 & 4 & 10 & 9 & 6 \\ 6 & 9 & 10 & 4 & 3 & 11 & 0 & 8 & 7 & 1 & 2 & 5 \\ 7 & 3 & 6 & 1 & 11 & 9 & 2 & 0 & 10 & 5 & 8 & 4 \\ 8 & 10 & 2 & 11 & 6 & 7 & 4 & 5 & 0 & 9 & 1 & 3 \\ 9 & 4 & 11 & 8 & 1 & 5 & 6 & 10 & 3 & 0 & 7 & 2 \\ 10 & 11 & 7 & 5 & 9 & 3 & 8 & 2 & 6 & 4 & 0 & 1 \\ 11 & 5 & 3 & 2 & 4 & 1 & 10 & 7 & 9 & 8 & 6 & 0 \end{pmatrix} \quad [\text{Equation 19}]$$

Hereinafter, a case where a reference signal for multi-antenna transmission is transmitted will be described.

Regarding the reference signal for multi-antenna transmission, to estimate a channel per antenna, respective reference signals can be multiplexed in general by using FDM/TDM/CDM.

When using the CDM, reference signals for channel estimation per antenna share the same frequency and time resource for each antenna, and thus the aforementioned reference signal structure for the single-antenna transmission can be directly used. That is, a number that indicates each element of a matrix can represent an index for a cell ID.

In case of using the FDM or TDM, a reference signal can be allocated exclusively according to a cell ID and an antenna index. That is, when N=6 and the number of antennas is 2 in the reference signal structure for multi-antenna transmission, if reference signals are allocated exclusively to a cell and an antenna, a reuse factor may be 6/2=3. More specifically, if N=6, six elements 0 to 5 can be allocated to antennas of each cell. For example, 0 may be mapped to a $1^{st}$ antenna of a cell 0, 1 may be mapped to a $2^{nd}$ antenna of the cell 0, 2 may be mapped to a $1^{st}$ antenna of a cell 1, 3 may be allocated to a $2^{nd}$ antenna of the cell 1, 4 may be allocated to a $1^{st}$ antenna of a cell 2, and 5 may be mapped to a $2^{nd}$ antenna of the cell 2. Of course, mapping of each antenna to an element is not limited to the present embodiment.

Equation 20 shows an example of the 2-dimensional matrix to which the proposed method is applied when N=6.

$$\begin{pmatrix} 0 & 3 & 4 & 1 & 2 & 5 \\ 1 & 0 & 2 & 3 & 5 & 4 \\ 2 & 4 & 0 & 5 & 1 & 3 \\ 3 & 1 & 5 & 0 & 4 & 2 \\ 4 & 5 & 3 & 2 & 0 & 1 \\ 5 & 2 & 1 & 4 & 3 & 0 \end{pmatrix} \quad [\text{Equation 20}]$$

Figure 25:
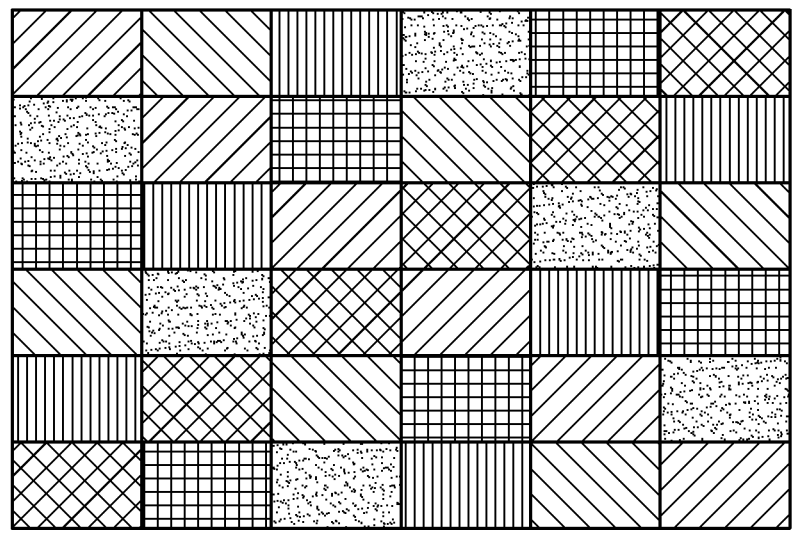
FIG. 25 shows an exemplary reference signal structure for multi-antenna transmission.

FIG. 25 shows an exemplary reference signal structure for multi-antenna transmission. Equation 20 above is applied to this reference signal structure.

The reference signal structure can be extended to a greater bandwidth or to a greater number of symbols. A matrix generated by using the proposed method can be repeated or can be extended to a different pattern by using a subblock index.

FIG. 26 shows another exemplary reference signal structure for multi-antenna transmission. This is a case where 18 subcarriers×12 symbols are used, and the structure can be configured with 6 subblocks with a size of 6×6. Referring to FIG. 26, the reference signal structure with the size of 6×6 of FIG. 19 is repetitively allocated. In this case, a subblock index is not considered.

Meanwhile, the reference signal structure can be extended by considering the subblock index. Each subblock may have a different subblock index.

Equation 21 is a case where a subblock index 1 is applied to the matrix of Equation 20 above.

$$\begin{pmatrix} 5 & 2 & 1 & 4 & 3 & 0 \\ 0 & 3 & 4 & 1 & 2 & 5 \\ 1 & 0 & 2 & 3 & 5 & 4 \\ 2 & 4 & 0 & 5 & 1 & 3 \\ 3 & 1 & 5 & 0 & 4 & 2 \\ 4 & 5 & 3 & 2 & 0 & 1 \end{pmatrix} \quad [\text{Equation 21}]$$

Equation 22 is a case where a subblock index 2 is applied to the matrix of Equation 20.

$$\begin{pmatrix} 4 & 5 & 3 & 2 & 0 & 1 \\ 5 & 2 & 1 & 4 & 3 & 0 \\ 0 & 3 & 4 & 1 & 2 & 5 \\ 1 & 0 & 2 & 3 & 5 & 4 \\ 2 & 4 & 0 & 5 & 1 & 3 \\ 3 & 1 & 5 & 0 & 4 & 2 \end{pmatrix} \quad [\text{Equation 22}]$$

Equation 23 is a case where a subblock index 3 is applied to the matrix of Equation 20.

$$\begin{pmatrix} 3 & 1 & 5 & 0 & 4 & 2 \\ 4 & 5 & 3 & 2 & 0 & 1 \\ 5 & 2 & 1 & 4 & 3 & 0 \\ 0 & 3 & 4 & 1 & 2 & 5 \\ 1 & 0 & 2 & 3 & 5 & 4 \\ 2 & 4 & 0 & 5 & 1 & 3 \end{pmatrix} \quad [\text{Equation 23}]$$

Equation 24 is a case where a subblock index 4 is applied to the matrix of Equation 20.

$$\begin{pmatrix} 2 & 4 & 0 & 5 & 1 & 3 \\ 3 & 1 & 5 & 0 & 4 & 2 \\ 4 & 5 & 3 & 2 & 0 & 1 \\ 5 & 2 & 1 & 4 & 3 & 0 \\ 0 & 3 & 4 & 1 & 2 & 5 \\ 1 & 0 & 2 & 3 & 5 & 4 \end{pmatrix} \quad [\text{Equation 24}]$$

Equation 25 is a case where a subblock index 5 is applied to the matrix of Equation 20.

$$\begin{pmatrix} 1 & 0 & 2 & 3 & 5 & 4 \\ 2 & 4 & 0 & 5 & 1 & 3 \\ 3 & 1 & 5 & 0 & 4 & 2 \\ 4 & 5 & 3 & 2 & 0 & 1 \\ 5 & 2 & 1 & 4 & 3 & 0 \\ 0 & 3 & 4 & 1 & 2 & 5 \end{pmatrix} \quad [\text{Equation 25}]$$

FIG. 27 shows another exemplary reference signal structure for multi-antenna transmission. Referring to FIG. 27, reference signals are deployed by applying matrices of Equation 20 to Equation 25 above to respective subblocks.

Figure 28:
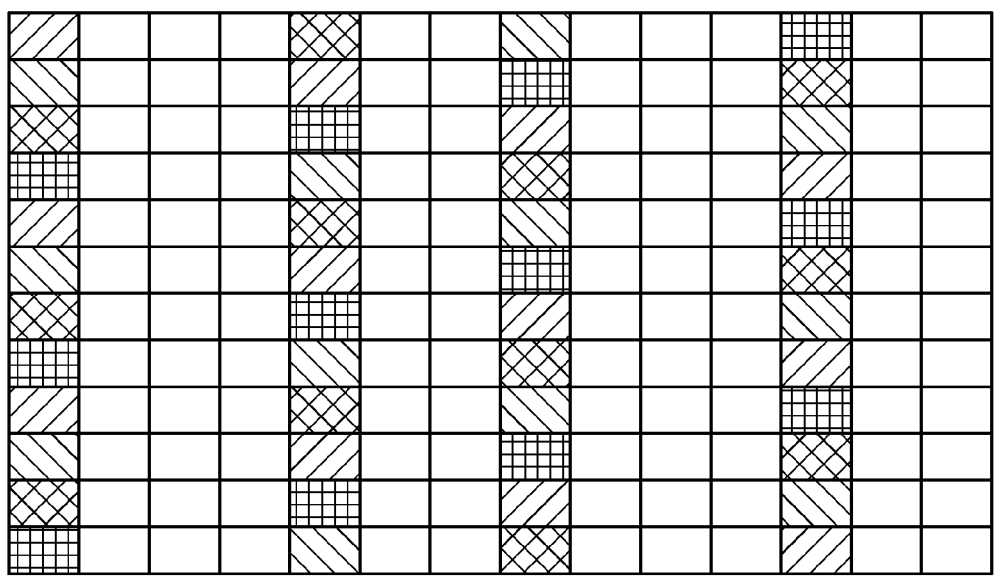
FIG. 28 shows a structure in which a reference signal structure generated according to the proposed method is mapped to a time and frequency resource.

FIG. 28 shows a structure in which a reference signal structure generated according to the proposed method is mapped to a time and frequency resource. It is assumed that N=4 and a size of a time and frequency resource region is 12×14. If it is assumed that the reference signals are transmitted in symbol indices 0, 4, 7, and 11, then the reference signal structure based on the matrix of Equation 10 above can be transmitted by being mapped to symbol indices 0, 4, 7, and 11.

FIG. 29 shows an exemplary reference signal structure allocated to one subframe. This shows a case of using a normal CP, and N=12. Reference signals are transmitted across all subframes, and this reference signal structure can be applied to an LCS RS and a CoMP RS, and if the number of antennas is 8, can be applied to a DRS or the like. The subframe may be a multimedia broadcast multicast service single frequency network (MBSFN) subframe. In addition, when a CRS overlaps with a reference signal transmitted by the proposed method, the reference signal transmitted by the proposed method can be punctured for the CRS.

FIG. 30 shows another exemplary reference signal structure allocated to one subframe. This shows a case of using a normal CP, and the reference signal structure of FIG. 30 is a structure in which a matrix generated by N=6 is repeated.

Figure 31:
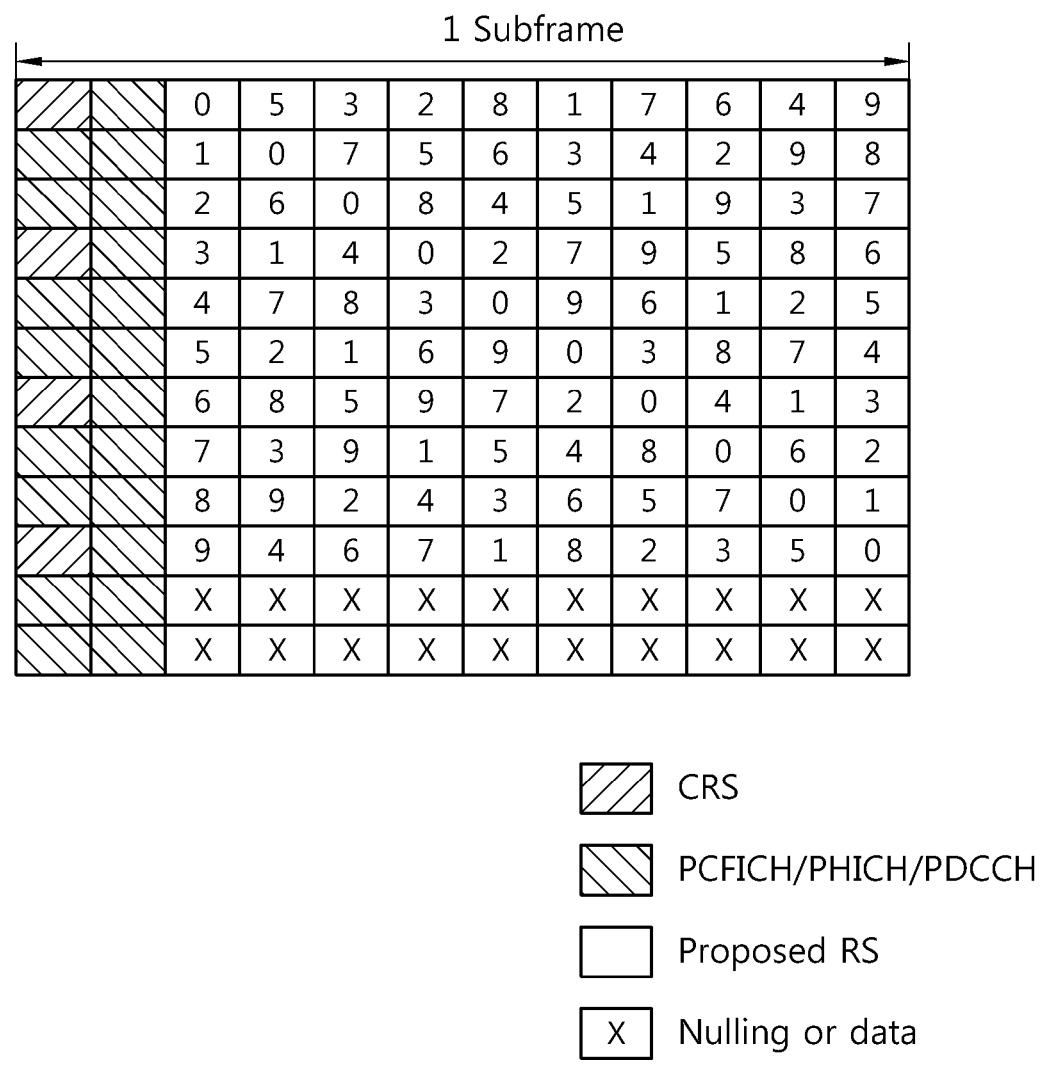

FIG. 31 shows another exemplary reference signal structure allocated to one subframe. This shows a case of an extended CP, and N=10. A latter part corresponding to remaining symbols in the matrix generated by N=10 is punctured.

FIG. 32 shows another exemplary reference signal structure allocated to one subframe. This shows a case of an extended CP, and N=12. A latter part corresponding to remaining symbols in the matrix generated by N=12 is punctured.

FIG. 33 shows another exemplary reference signal structure allocated to one subframe. This shows a case of an extended CP, and N=12. A former part corresponding to remaining symbols in the matrix generated by N=12 is punctured.

FIG. 34 shows another exemplary reference signal structure allocated to one subframe. This shows a case of an extended CP, and N=6. The matrix generated by N=6 is repetitively allocated, and a latter part corresponding to remaining symbols in the matrix is punctured.

Figure 35:
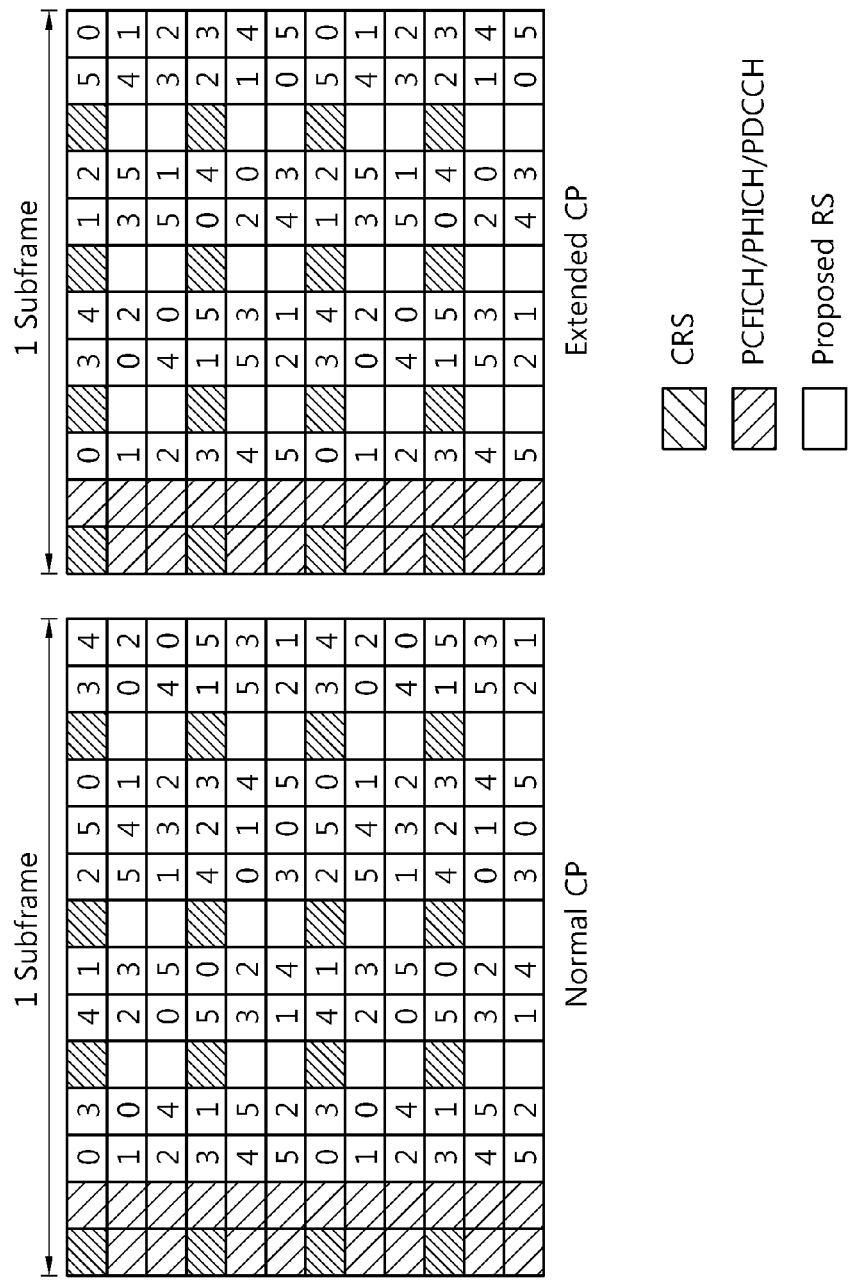

FIG. 35 shows another exemplary reference signal structure allocated to one subframe. A reference signal transmitted by the proposed method can be transmitted except for an OFDM symbol in which a CRS and a control channel are transmitted. The control channel occupies a $1^{st}$ OFDM symbol and a $2^{nd}$ OFDM symbol. The CRS is a CRS for antenna ports 0 and 1.

Figure 36:
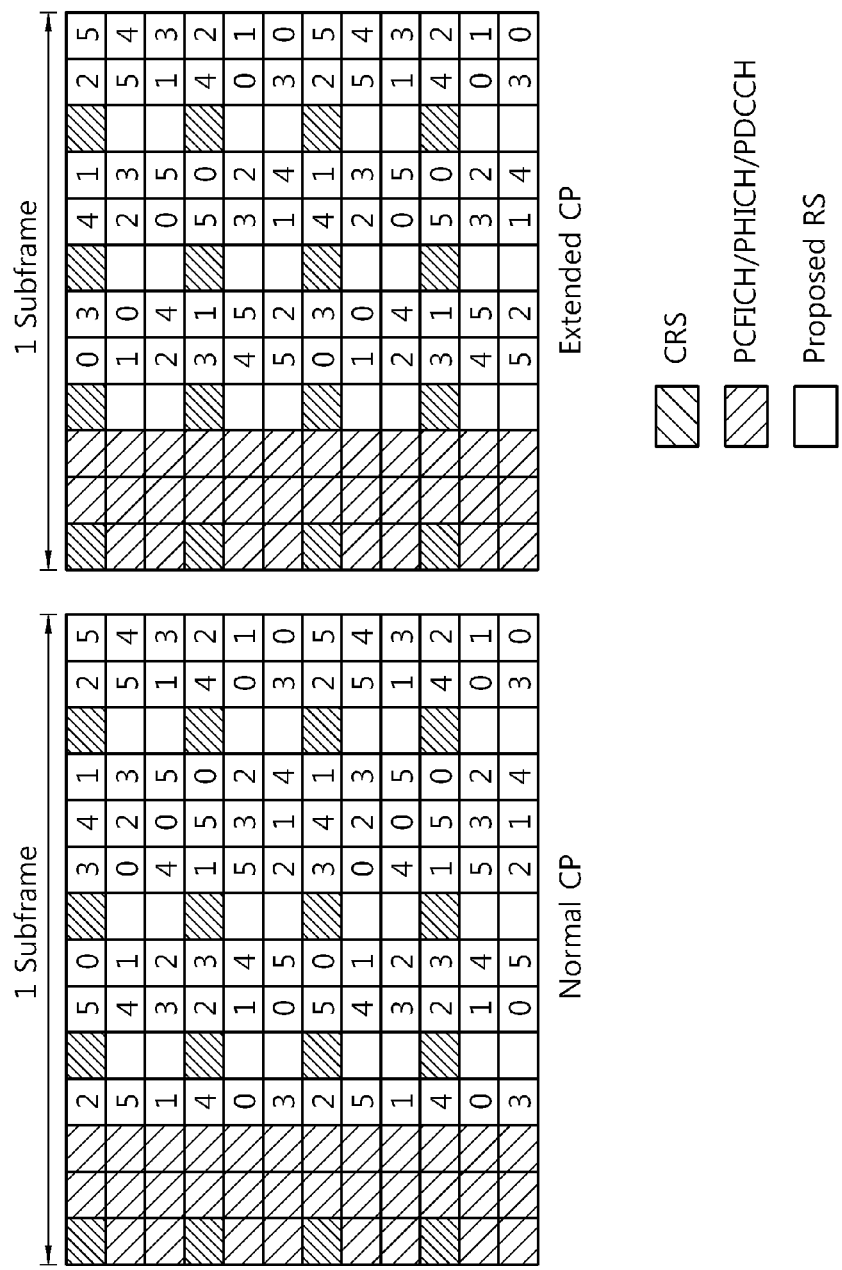

FIG. 36 shows another exemplary reference signal structure allocated to one subframe. A reference signal transmitted by the proposed method can be transmitted except for an OFDM symbol in which a CRS and a control channel are transmitted. The control channel occupies a $1^{st}$ OFDM symbol and a $3^{rd}$ OFDM symbol. The CRS is a CRS for antenna ports 0 and 1.

Figure 37:
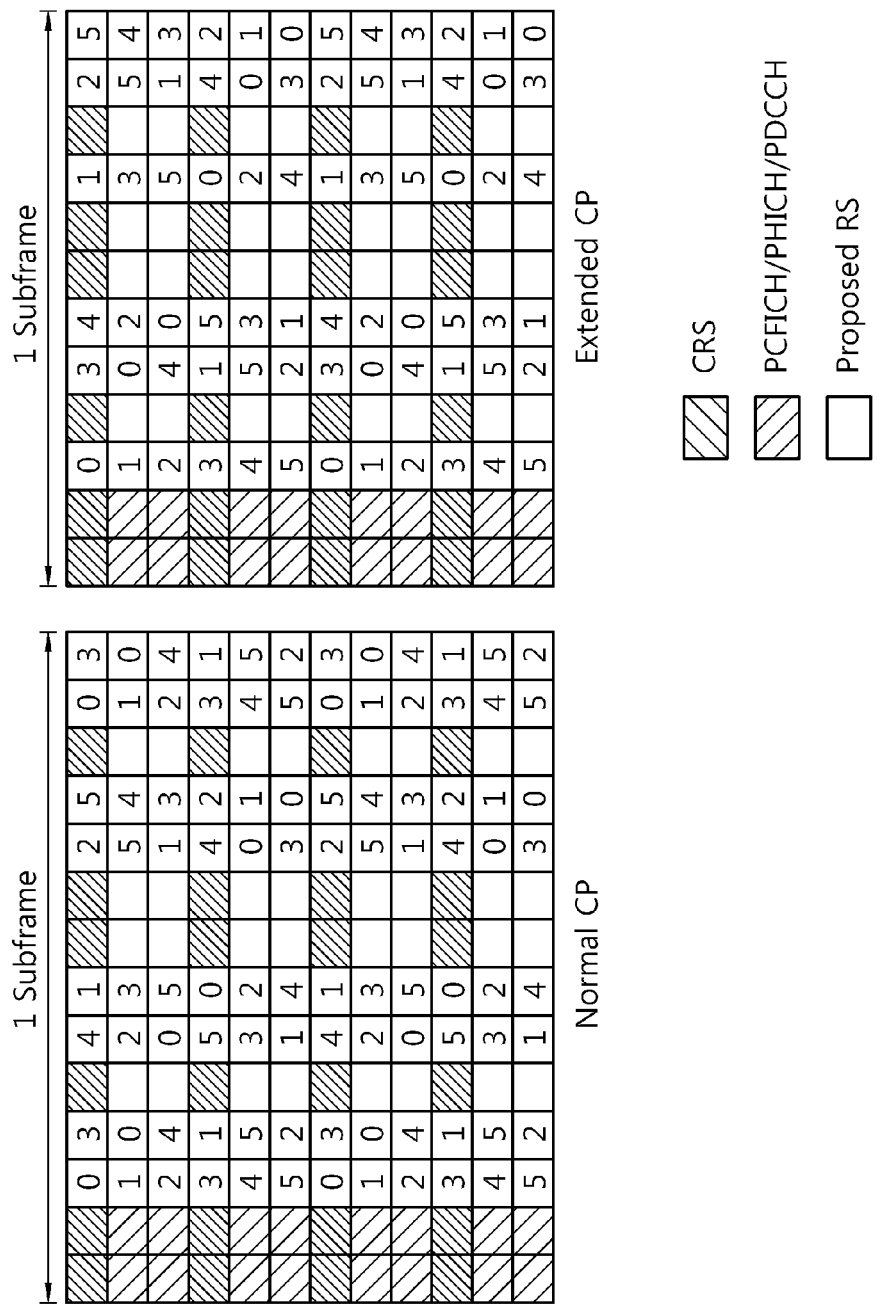

FIG. 37 shows another exemplary reference signal structure allocated to one subframe. A reference signal transmitted by the proposed method can be transmitted except for a part in which a CRS and a control channel are transmitted. The CRS is a CRS for antenna ports 0 to 3.

Referring back to FIG. 22, in step S120, the UE performs channel estimation or positioning by using the $1^{st}$ reference signal and the $2^{nd}$ reference signal.

A reference signal can be transmitted by allocating columns or rows of the Latin square matrix generated by the proposed invention to respective cells and/or antenna ports. In addition, in each column or row, a matrix element can be mapped to an antenna port. For example, matrix elements 0 to 3 can be mapped to antenna ports 0 to 3 of each cell #0, and matrix elements 4 to 7 can be mapped to antenna ports 0 to 3 of each cell #1. Although it is assumed hereinafter that the reference signal is a CSI RS, the present invention is not limited thereto. A pattern in which the CSI RS is mapped to a resource region can be defined based on a cell ID or a part of the cell ID, or can be signaled from a BS or a higher layer. In addition, although the following embodiments are based on the 12×12 Latin square matrix of Equation 19 above, the embodiments can also apply to another-sized Latin square matrix or another type of matrix, for example, a Costas array-based matrix or a diagonal pattern.

CSI RSs between respective cells can be multiplexed by the FDM scheme. CSI RSs between antenna ports can be multiplexed by the FDM/TDM scheme. Ports of some antennas can reuse a CSI RS pattern on an OFDM symbol basis.

Figure 38:
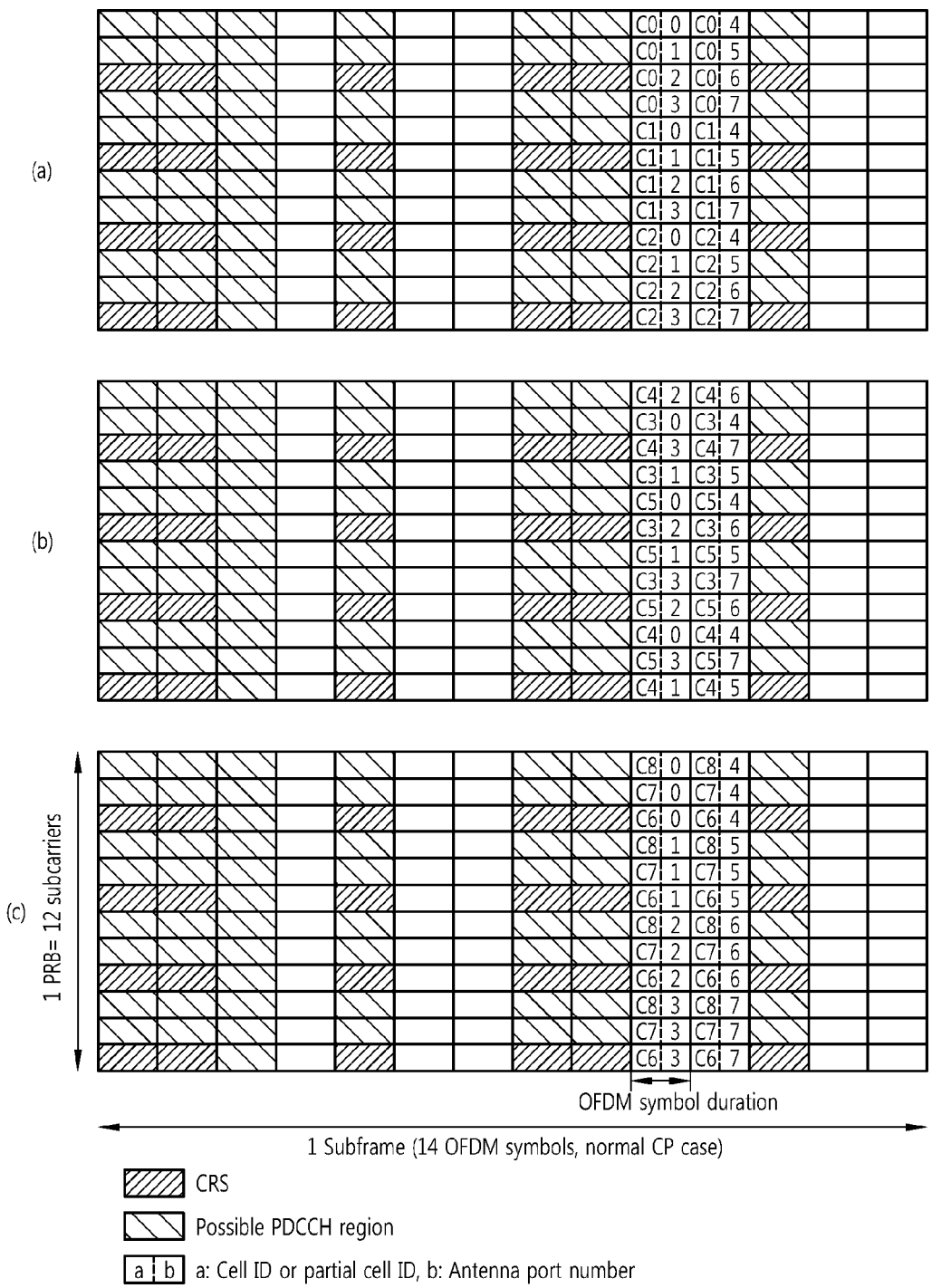

FIG. 38 shows another exemplary reference signal structure allocated to one subframe. In FIG. 38A, a CSI RS of a $9^{th}$ OFDM symbol is based on a $1^{st}$ column of Equation 19 above. In the $1^{st}$ column of Equation 19 above, matrix elements 0 to 3 are mapped to antenna ports 0 to 3 of each cell C0, matrix elements 4 to 7 are mapped to antenna ports 0 to 3 of each cell C1, and matrix elements 8 to 12 are mapped to antenna ports 0 to 3 of each cell C2. In a CSI RS of a $10^{th}$ OFDM symbol, a pattern mapped to antenna ports 4 to 7 of each cell (i.e., C0, C1, and C2) is identical to a pattern mapped to antenna ports 0 to 3 of the corresponding cell. In FIG. 38B, a CSI RS of a $9^{th}$ OFDM symbol is mapped based on a $2^{nd}$ column of Equation 19 above. In the $2^{nd}$ column of Equation 19 above, matrix elements 0 to 3 are respectively mapped to antenna ports 0 to 3 of a cell C3, matrix elements 4 to 7 are respectively mapped to antenna ports 0 to 3 of a cell C4, and matrix elements 8 to 12 are respectively mapped to antenna ports 0 to 3 of a cell C5. In a CSI RS of a $10^{th}$ OFDM symbol, a pattern mapped to antenna ports 4 to 7 of each cell (i.e., C3, C4, and C5) is identical to a pattern mapped to antenna ports 0 to 3 of the corresponding cell. In FIG. 38C, a CSI RS of a $9^{th}$ OFDM symbol is mapped based on a $3^{rd}$ column of Equation 19 above. In the $3^{rd}$ column of Equation 19 above, matrix elements 0 to 3 are respectively mapped to antenna ports 0 to 3 of a cell C6, matrix elements 4 to 7 are respectively mapped to antenna ports 0 to 3 of a cell C7, and matrix elements 8 to 12 are respectively mapped to antenna ports 0 to 3 of a cell C8. In a CSI RS of a $10^{th}$ OFDM symbol, a pattern mapped to antenna ports 4 to 7 of each cell (i.e., C6, C7, and C8) is identical to a pattern mapped to antenna ports 0 to 3 of the corresponding cell.

According to the aforementioned method, a reference signal pattern for three cells can be generated for each column of the matrix of Equation 19 above. Some of reference signal patterns generated in this manner constitute orthogonal patterns, and others constitute quasi-orthogonal patterns. Three reference signal patterns generated in each column of the matrix constitute orthogonal patterns from each other. Reference signal patterns generated between columns of the matrix constitute quasi-orthogonal patterns.

In addition, when each cell transmits a CSI RS according to the aforementioned method, collision can be minimized. For example, between the cell C0 and the cell C6, collision occurs in the $3^{rd}$ subcarrier, that is, between the CSI RS of the antenna port 2 of the cell C0 and the CSI RS of the antenna port 0 of the cell C6 and between the CSI RS of the antenna port 6 of the cell C0 and the CSI RS of the antenna port 4 of the cell C6. That is, from the perspective of CSI RS collision between cells, a probability of collision occurrence is decreased from the conventional probability 1 (8/8) to 0.25 (2/4).

In addition, when CSI RSs are transmitted by being mapped to two or more resource blocks, the CSI RSs can be transmitted by exchanging OFDM symbols for transmitting CSI RSs of antenna ports 0 to 3 and CSI RSs of antenna ports 4 to 7 to transmit the CRS RSs with constant power for each antenna port. For example, in FIG. 38A, it can be transmitted in a $1^{st}$ PRB as shown in FIG. 39A. In a $2^{nd}$ PRB, CSI RSs of antenna ports 4 to 7 can be transmitted in a $9^{th}$ OFDM symbol, and CSI RSs of antenna ports 0 to 3 can be transmitted in a $10^{th}$ OFDM symbol.

If a CSI RS can be configured at a desired location according to a radio frame, a subframe, a slot, or an OFDM symbol level, the CSI RS can be multiplexed with the TDM scheme. That is, different cells can use different time resources. The embodiment of FIG. 36 can be combined with multiplexing of the TDM scheme.

Figure 39:
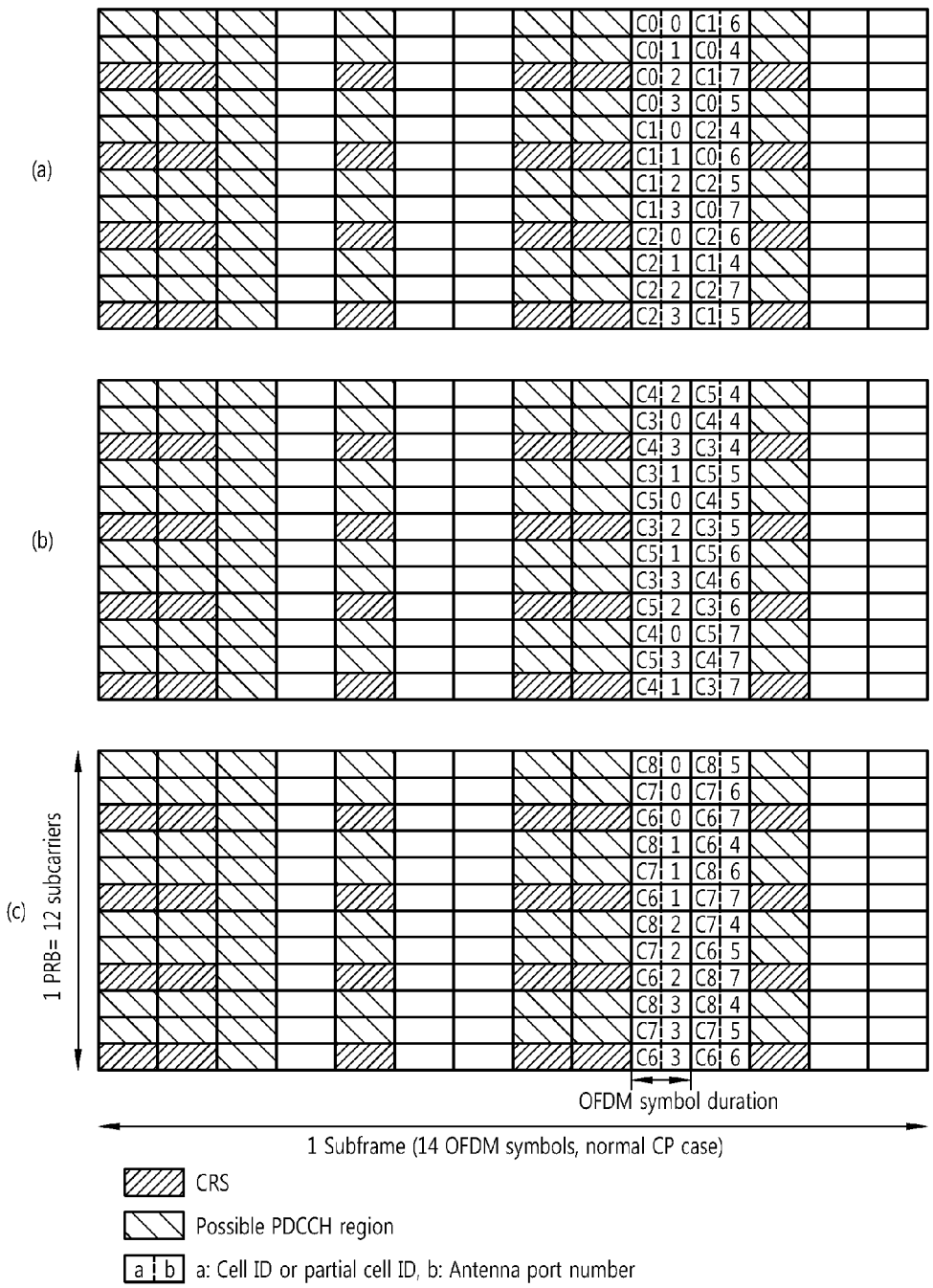

In addition, although it is assumed in FIG. 39 that CSI RSs are mapped in the same pattern to the $9^{th}$ OFDM symbol and the $10^{th}$ OFDM symbol, it is also possible to apply an independent pattern to each OFDM symbol.

CSI RSs between respective cells can be multiplexed by the FDM scheme. CSI RSs between antenna ports can be multiplexed by the FDM/TDM scheme. Different patterns can be applied on an OFDM symbol basis. That is, a reference signal pattern can be formed by applying different columns or rows in the Latin square matrix. In this case, a reference signal pattern to be mapped to a $2^{nd}$ OFDM symbol can be based on a column of a Latin square matrix having a specific offset with respect to a column of a Latin square matrix used by a reference signal pattern to be mapped to a $1^{st}$ OFDM symbol. For example, in a case where the offset value is 1, if an index of a column of a matrix used by a reference signal pattern to be mapped to the $1^{st}$ OFDM symbol is m, an index of a column of a matrix used by a reference signal pattern to be mapped to the $2^{nd}$ OFDM symbol may be (m+1) mod 12.

FIG. 39 shows another exemplary reference signal structure allocated to one subframe. In FIG. 39A, a CSI RS of a $9^{th}$ OFDM symbol is based on a $1^{st}$ column of Equation 19 above. In the $1^{st}$ column of Equation 19 above, matrix elements 0 to 3 are mapped to antenna ports 0 to 3 of each cell C0, matrix elements 4 to 7 are mapped to antenna ports 0 to 3 of each cell C1, and matrix elements 8 to 12 are mapped to antenna ports 0 to 3 of each cell C2. In a CSI RS of a $10^{th}$ OFDM symbol, a pattern mapped to antenna ports 4 to 7 of each cell (i.e., C0, C1, and C2) is identical to a pattern mapped to antenna ports 0 to 3 of the corresponding cell. The CSI RS of the $10^{th}$ OFDM symbol is based on a $2^{nd}$ column of Equation 19 above. In the $2^{nd}$ column of Equation 19 above, matrix elements 0 to 3 are respectively mapped to antenna ports 4 to 7 of a cell C0, matrix elements 4 to 7 are respectively mapped to antenna ports 4 to 7 of a cell C1, and matrix elements 8 to 12 are respectively mapped to antenna ports 4 to 7 of a cell C2. In FIG. 39B, a CSI RS of a $9^{th}$ OFDM symbol is based on a $2^{nd}$ column of Equation 19 above, and a CSI RS of a $10^{th}$ OFDM symbol is based on a $3^{rd}$ column of Equation 19 above. In FIG. 39C, a CSI RS of a $9^{th}$ OFDM symbol is based on a $3^{rd}$ column of Equation 19 above, and a CSI RS of a $10^{th}$ OFDM symbol is based on a $4^{th}$ column of Equation 19 above. Three reference signal patterns generated in each column of the matrix constitute orthogonal patterns from each other. Reference signal patterns generated between columns of the matrix constitute quasi-orthogonal patterns.

CSI RSs between respective cells can be multiplexed by the FDM scheme. CSI RSs between antenna ports can be multiplexed by the FDM/TDM/CDM scheme. Different patterns can be applied on an OFDM symbol basis. For convenience of explanation, when multiplexing of the FDM/CDM scheme is applied to CSI RSs between antenna ports, two antenna ports can be multiplexed with the CDM scheme by assuming a case where a spreading factor (SF) is 2. Subsequently, the remaining antenna ports can be multiplexed with the FDM scheme. For example, antenna ports 0 and 4, antenna ports 1 and 5, antenna ports 2 and 6, and antenna ports 3 and 7 can be multiplexed with each other by using the CDM scheme, and the remaining antenna ports can be multiplexed by using the FDM scheme. A Walsh code used by the antenna ports 0 to 3 may be [1 1] and a Walsh code used by antenna ports 4 to 7 may be [1 −1].

Figure 40:
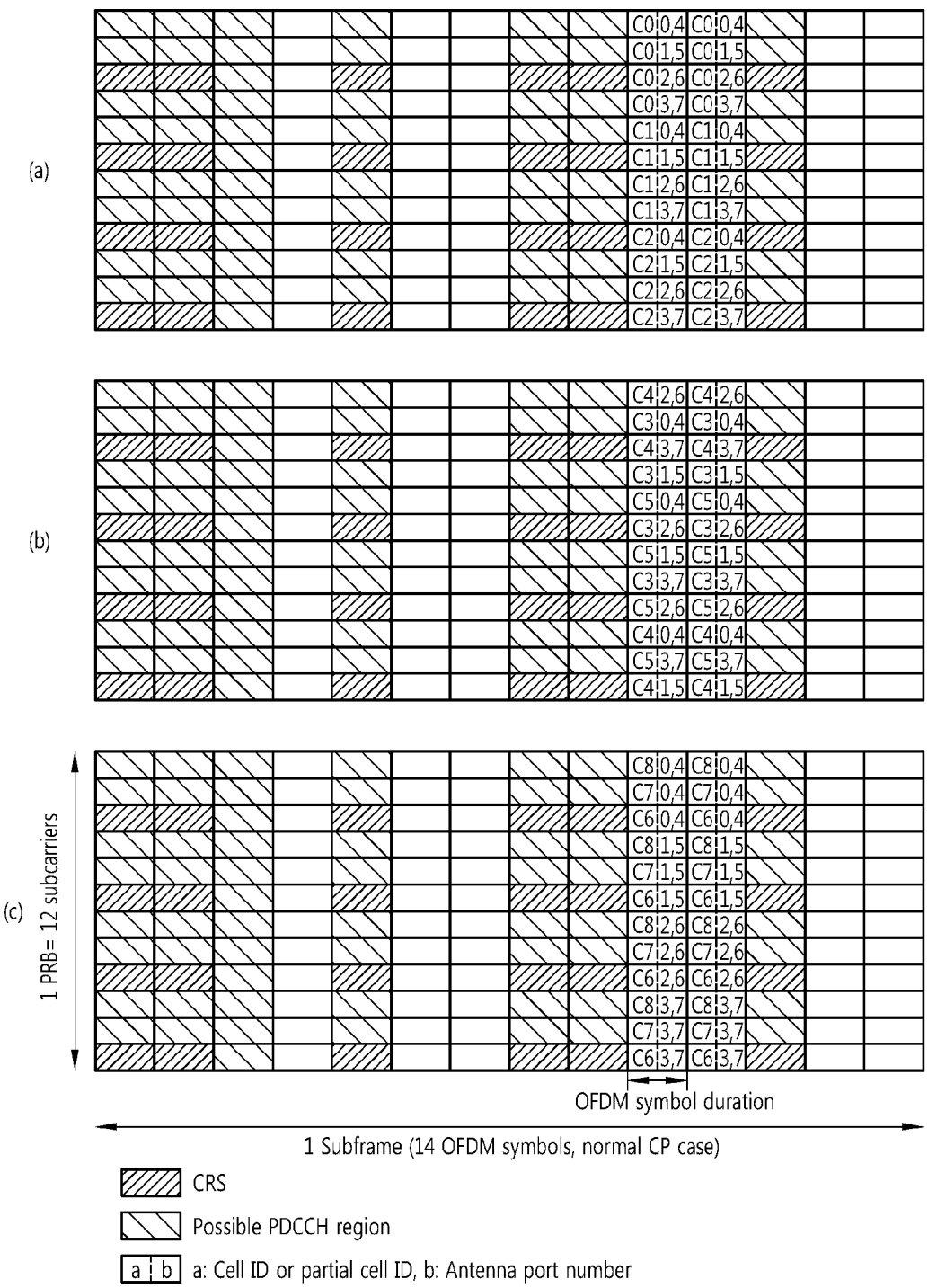

FIG. 40 shows another exemplary reference signal structure allocated to one subframe. In FIG. 40A, CSI RSs of a $9^{th}$ OFDM symbol and a $10^{th}$ OFDM symbol are based on a $1^{st}$ column of Equation 19 above. In the $1^{st}$ column of Equation 19 above, matrix elements 0 to 3 are mapped to antenna ports 0 to 7 of each cell C0, matrix elements 4 to 7 are mapped to antenna ports 0 to 7 of each cell C1, and matrix elements 8 to 12 are mapped to antenna ports 0 to 7 of each cell C2. The antenna ports 0 and 4, the antenna ports 1 and 5, the antenna ports 2 and 6, and the antenna ports 3 and 7 are multiplexed by using the CDM scheme. In FIG. 40B, CSI RSs of a $9^{th}$ OFDM symbol and a $10^{th}$ OFDM symbol are based on the $2^{nd}$ column of Equation 19 above. In FIG. 400, CSI RSs of a $9^{th}$ OFDM symbol and a $10^{th}$ OFDM symbol are based on the $3^{rd}$ column of Equation 19 above. Three reference signal patterns generated in each column of the matrix constitute orthogonal patterns from each other. Reference signal patterns generated between columns of the matrix constitute quasi-orthogonal patterns.

CSI RSs between respective cells and between respective antenna ports can be multiplexed with the FDM scheme, and only deployment of antenna ports can constitute a quasi-orthogonal pattern. For this, various types of Latin square matrix can be used. For example, a reference signal pattern can be configured based on the 4×4 Latin square matrix of Equation 9 above.

Figure 41:
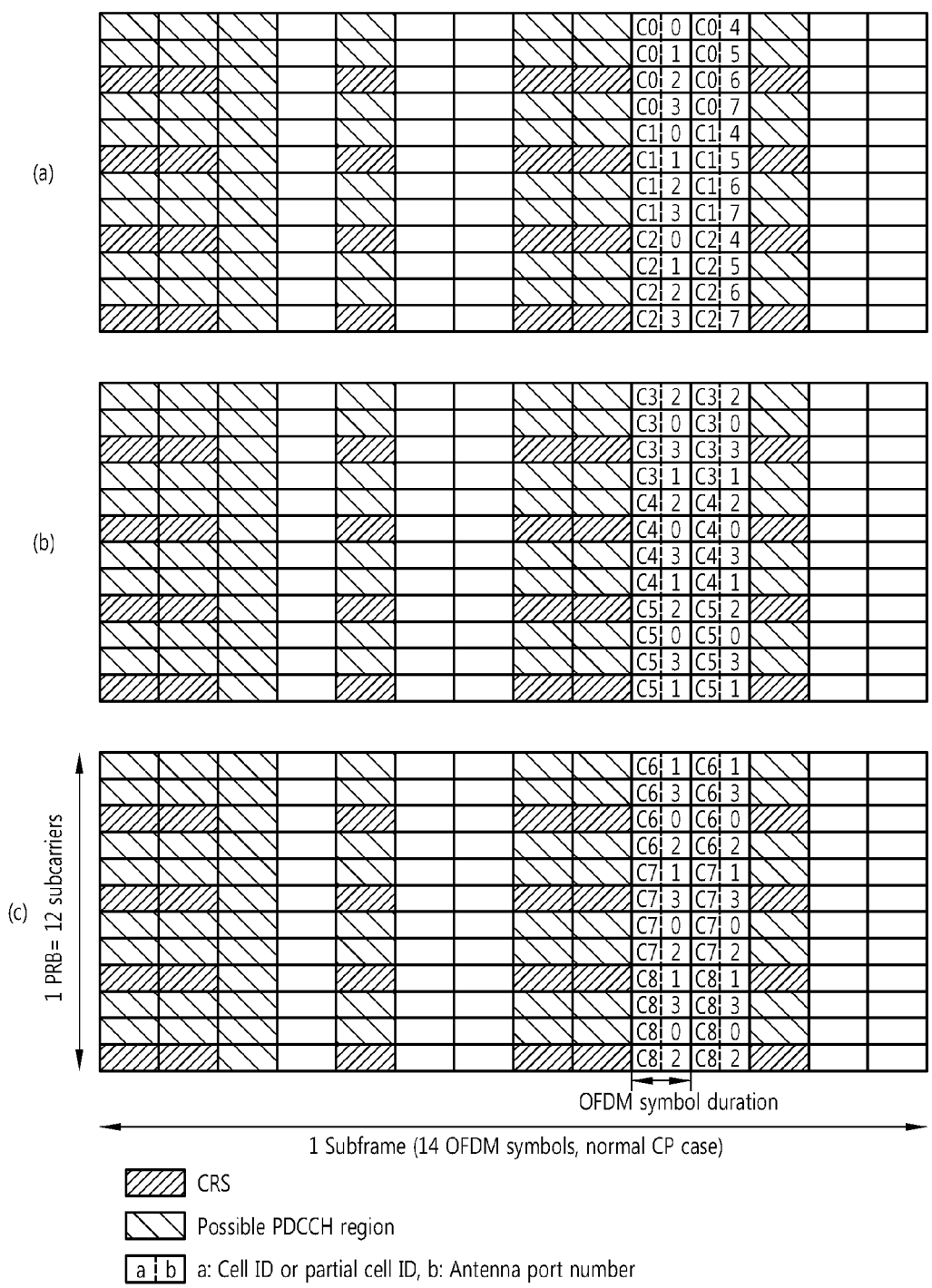

FIG. 41 shows another exemplary reference signal structure allocated to one subframe. In FIG. 40A, CSI RSs of a $9^{th}$ OFDM symbol and a $10^{th}$ OFDM symbol are based on a $1^{st}$ column of Equation 9 above. In the $1^{st}$ column of Equation 9 above, matrix elements 0 to 3 are respectively mapped to antenna ports 0 to 3 of cells C0, C1, and C2. In FIG. 41B, CSI RSs of a $9^{th}$ OFDM symbol and a $10^{th}$ OFDM symbol are based on the $2^{nd}$ column of Equation 9 above. In FIG. 41C, CSI RSs of a $9^{th}$ OFDM symbol and a $10^{th}$ OFDM symbol are based on the $3^{rd}$ column of Equation 9 above. Although it is assumed in FIG. 41 that multiplexing is achieved between respective antenna ports by using the FDM scheme, multiplexing can also be achieved by using the CDM scheme as shown in FIG. 40. In this case, a pattern of CSI RSs of antenna ports 4 to 7 may directly follow a pattern of CSI RSs of antenna ports 0 to 3. In addition, CSI RSs between respective antenna ports can be multiplexed with the FDM/CDM scheme, and only cell deployment can be formed in a quasi-orthogonal pattern.

Multiplexing can be performed between respective cells or respective antenna ports by using a diagonal matrix as a Latin square matrix.

Equation 26 is an example of a 12×12-sized diagonal matrix.

$$\begin{pmatrix} 0 & 11 & 10 & 9 & 8 & 7 & 6 & 5 & 4 & 3 & 2 & 1 \\ 1 & 0 & 11 & 10 & 9 & 8 & 7 & 6 & 5 & 4 & 3 & 2 \\ 2 & 1 & 0 & 11 & 10 & 9 & 8 & 7 & 6 & 5 & 4 & 3 \\ 3 & 2 & 1 & 0 & 11 & 10 & 9 & 8 & 7 & 6 & 5 & 4 \\ 4 & 3 & 2 & 1 & 0 & 11 & 10 & 9 & 8 & 7 & 6 & 5 \\ 5 & 4 & 3 & 2 & 1 & 0 & 11 & 10 & 9 & 8 & 7 & 6 \\ 6 & 5 & 4 & 3 & 2 & 1 & 0 & 11 & 10 & 9 & 8 & 7 \\ 7 & 6 & 5 & 4 & 3 & 2 & 1 & 0 & 11 & 10 & 9 & 8 \\ 8 & 7 & 6 & 5 & 4 & 3 & 2 & 1 & 0 & 11 & 10 & 9 \\ 9 & 8 & 7 & 6 & 5 & 4 & 3 & 2 & 1 & 0 & 11 & 10 \\ 10 & 9 & 8 & 7 & 6 & 5 & 4 & 3 & 2 & 1 & 0 & 11 \\ 11 & 10 & 9 & 8 & 7 & 6 & 5 & 4 & 3 & 2 & 1 & 0 \end{pmatrix} \quad \text{[Equation 26]}$$

Figure 42:
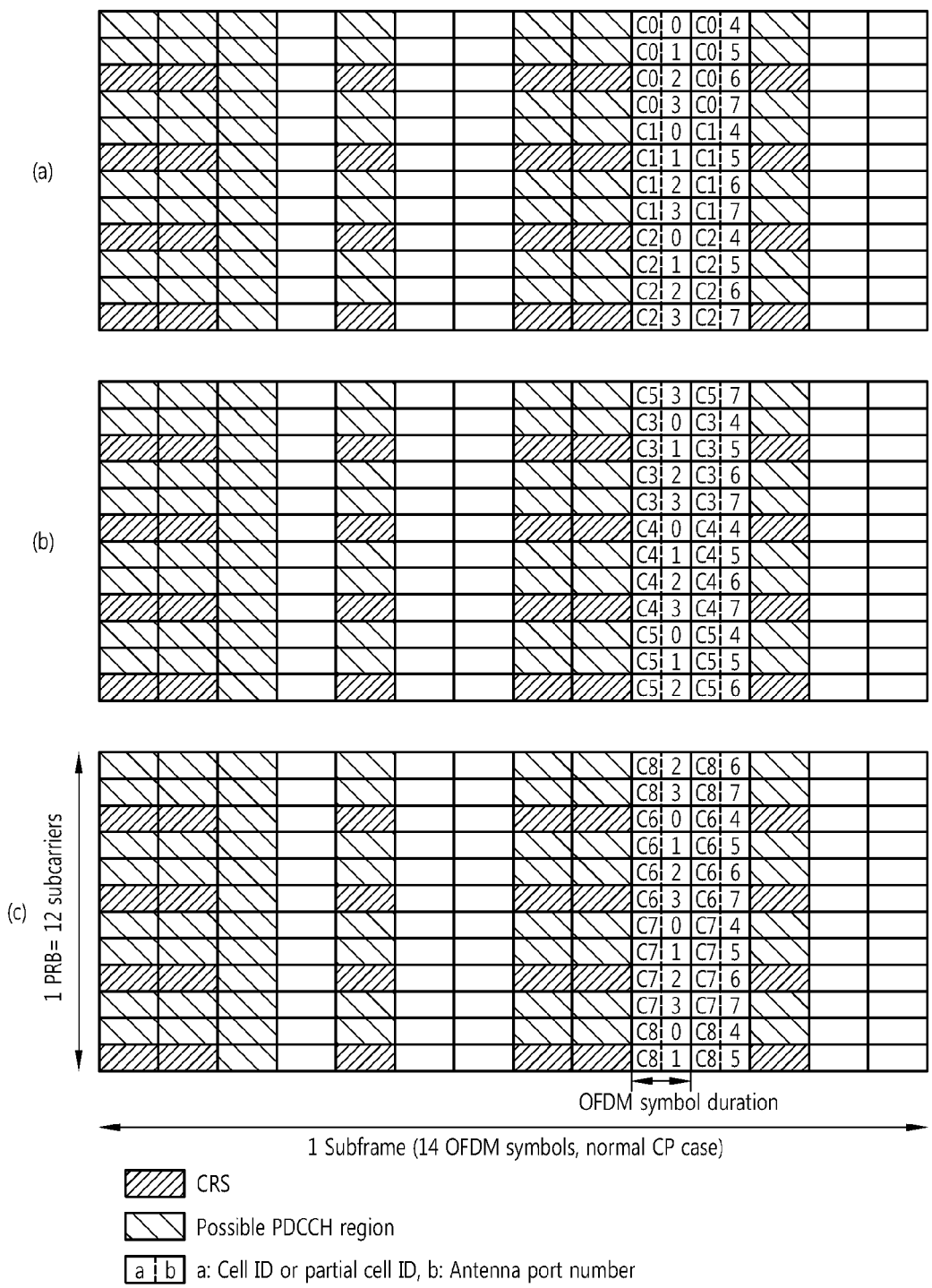

FIG. 42 shows another exemplary reference signal structure allocated to one subframe. In FIG. 42A, a CSI RS of a $9^{th}$ OFDM symbol is based on a $1^{st}$ column of Equation 26 above. In the $1^{st}$ column of Equation 26 above, matrix elements 0 to 3 are mapped to antenna ports 0 to 3 of each cell C0, matrix elements 4 to 7 are mapped to antenna ports 0 to 3 of each cell C1, and matrix elements 8 to 12 are mapped to antenna ports 0 to 3 of each cell C2. In a CSI RS of a $10^{th}$ OFDM symbol, a pattern mapped to antenna ports 4 to 7 of each cell (i.e., C0, C1, and C2) is identical to a pattern mapped to antenna ports 0 to 3 of the corresponding cell. In FIG. 42B, a CSI RS of a $9^{th}$ OFDM symbol is mapped based on a $2^{nd}$ column of Equation 26 above. In the $2^{nd}$ column of Equation 26 above, matrix elements 0 to 3 are respectively mapped to antenna ports 0 to 3 of a cell C3, matrix elements 4 to 7 are respectively mapped to antenna ports 0 to 3 of a cell C4, and matrix elements 8 to 12 are respectively mapped to antenna ports 0 to 3 of a cell C5. In a CSI RS of a $10^{th}$ OFDM symbol, a pattern mapped to antenna ports 4 to 7 of each cell (i.e., C3, C4, and C5) is identical to a pattern mapped to antenna ports 0 to 3 of the corresponding cell. In FIG. 42C, a CSI RS of a $9^{th}$ OFDM symbol is mapped based on a $3^{rd}$ column of Equation 26 above. In the $3^{rd}$ column of Equation 26 above, matrix elements 0 to 3 are respectively mapped to antenna ports 0 to 3 of a cell C6, matrix elements 4 to 7 are respectively mapped to antenna ports 0 to 3 of a cell C7, and matrix elements 8 to 12 are respectively mapped to antenna ports 0 to 3 of a cell C8. In a CSI RS of a $10^{th}$ OFDM symbol, a pattern mapped to antenna ports 4 to 7 of each cell (i.e., C6, C7, and C8) is identical to a pattern mapped to antenna ports 0 to 3 of the corresponding cell.

Alternatively, columns can be used by selecting them with two-spacing intervals in Equation 26 above.

Figure 43:
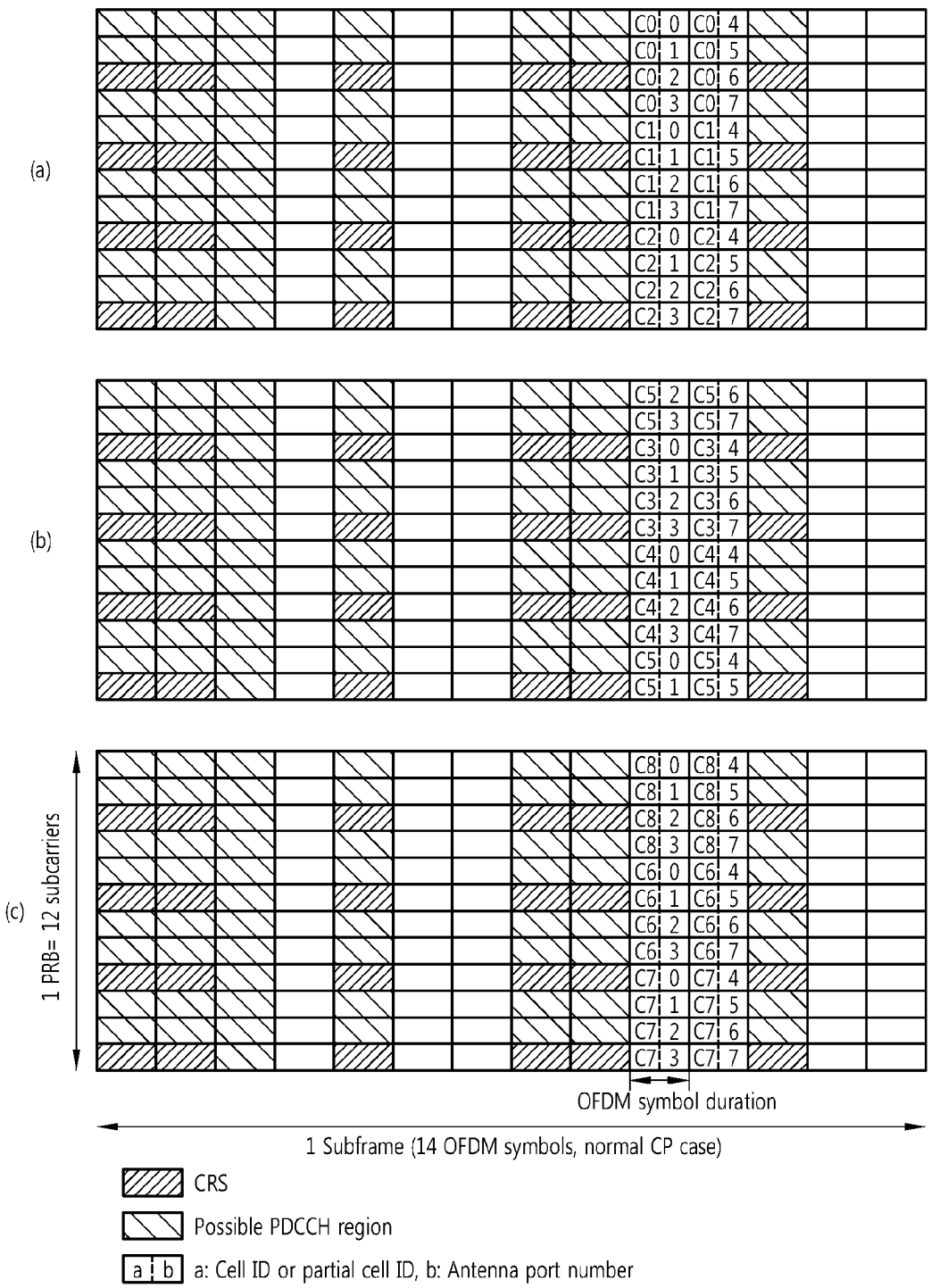

FIG. 43 shows another exemplary reference signal structure allocated to one subframe. In FIG. 43A, a CSI RS of a $9^{th}$ OFDM symbol is based on a $1^{st}$ column of Equation 26 above. In the $1^{st}$ column of Equation 26 above, matrix elements 0 to 3 are mapped to antenna ports 0 to 3 of each cell C0, matrix elements 4 to 7 are mapped to antenna ports 0 to 3 of each cell C1, and matrix elements 8 to 12 are mapped to antenna ports 0 to 3 of each cell C2. In a CSI RS of a $10^{th}$ OFDM symbol, a pattern mapped to antenna ports 4 to 7 of each cell (i.e., C0, C1, and C2) is identical to a pattern mapped to antenna ports 0 to 3 of the corresponding cell. In FIG. 43B, a CSI RS of a $9^{th}$ OFDM symbol is mapped based on a $3^{rd}$ column of Equation 26 above. In the $3^{rd}$ column of Equation 26 above, matrix elements 0 to 3 are respectively mapped to antenna ports 0 to 3 of a cell C3, matrix elements 4 to 7 are respectively mapped to antenna ports 0 to 3 of a cell C4, and matrix elements 8 to 12 are respectively mapped to antenna ports 0 to 3 of a cell C5. In a CSI RS of a $10^{th}$ OFDM symbol, a pattern mapped to antenna ports 4 to 7 of each cell (i.e., C3, C4, and C5) is identical to a pattern mapped to antenna ports 0 to 3 of the corresponding cell. In FIG. 43C, a CSI RS of a $9^{th}$ OFDM symbol is mapped based on a $5^{th}$ column of Equation 26 above. In the $5^{th}$ column of Equation 26 above, matrix elements 0 to 3 are respectively mapped to antenna ports 0 to 3 of a cell C6, matrix elements 4 to 7 are respectively mapped to antenna ports 0 to 3 of a cell C7, and matrix elements 8 to 12 are respectively mapped to antenna ports 0 to 3 of a cell C8. In a CSI RS of a $10^{th}$ OFDM symbol, a pattern mapped to antenna ports 4 to 7 of each cell (i.e., C6, C7, and C8) is identical to a pattern mapped to antenna ports 0 to 3 of the corresponding cell.

Figure 44:
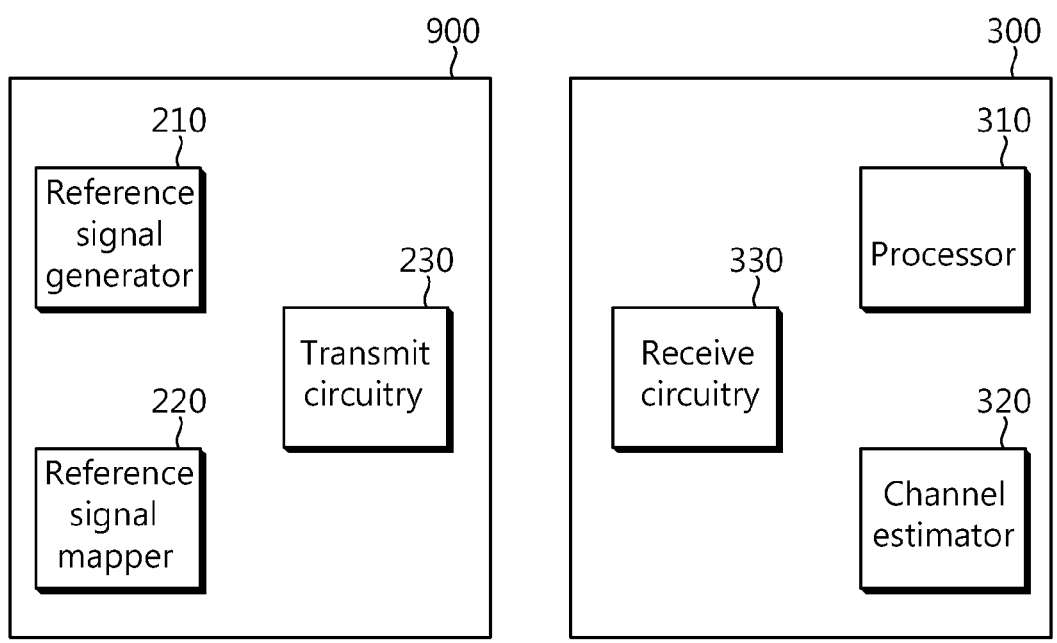
FIG. 44 is a block diagram of a transmitter and a receiver for implementing an embodiment of the present invention.

FIG. 44 is a block diagram of a transmitter and a receiver for implementing an embodiment of the present invention.

A transmitter 200 includes a reference signal generating unit 210, a reference signal mapper 220, and a transmit circuitry 230. The reference signal generating unit 210 and the reference signal mapper 220 implement the proposed functions, procedures, and/or methods. The reference signal generating unit 210 generates a reference signal. The reference signal mapper 220 maps the reference signal to a resource region on the basis of a Latin square matrix generated by the proposed method. The transmit circuitry 230 transmits and/or receives a radio signal including the reference signal.

A receiver 300 includes a processor 310, a channel estimator 320, and a receive circuitry 330.

The processor 310 and the channel estimator 320 implement the proposed functions, procedures, and/or methods. The transmit circuitry 330 transmits and/or receives a radio signal including a reference signal. The channel estimator 320 receives a plurality of reference signals mapped on a resource region respectively from a plurality of BSs, and estimates a location of a UE by using the received reference signals. A resource element for transmitting the plurality of reference signals on the resource region is determined according to an index on the Latin square matrix occupied respectively by different elements among N elements constituting the N×N-sized Latin square matrix. The processor 310 processes the radio signal by using the estimated channel.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting a reference signal in a wireless communication system, the method comprising:
   transmitting by a first base station a first reference signal to a user equipment by mapping the first reference signal to a resource region; and
   transmitting by a second base station a second reference signal to the user equipment by mapping the second reference signal to the resource region,
   wherein resource elements to which the first reference signal and the second reference signal are mapped in the resource region are determined in accordance with an index on a Latin square matrix occupied by two different elements from among N elements constituting the Latin square matrix with a size of N×N, wherein a frequency index k of a resource element to which the first reference signal or the second reference signal is mapped is determined by:

$$k_n^m = \mathrm{mod}(\mathrm{mod}(a^m \cdot b + c, N_p) + d, N),$$

wherein:

m is an index of a cell identifier (ID) or a cell ID index obtained by considering a reuse factor;

n is an orthogonal frequency division multiplexing (OFDM) symbol index of a resource element for transmitting the first reference signal or the second reference signal;

$a^m$ is a function of the index of the cell ID or a function of the reuse factor;

b, c, d, and Np are any integers; and mod(x,y) is a remainder obtained by dividing x by y.

2. The method of claim 1, wherein an OFDM symbol of the resource element to which the first reference signal or the second reference signal is mapped is an OFDM symbol to which a cell-specific reference signal (CRS) or a physical downlink control channel (PDCCH) is not mapped.

3. The method of claim 1, wherein at least one of columns or rows of the Latin square matrix is permutated or circularly shifted.

4. The method of claim 3, wherein the permutation or cyclic shift is performed on the remaining columns or rows while fixing one column or row of the Latin square matrix.

5. The method of claim 1,
wherein the resource region includes a plurality of subblocks having a size of N×N, and
wherein the resource elements to which the first reference signal and the second reference signal are mapped in each of the plurality of subblocks are determined according to the Latin square matrix corresponding to each of the plurality of subblocks.

6. The method of claim 5, wherein the Latin square matrix corresponding to each of the plurality of subblocks varies along a frequency domain or a time domain.

* * * * *